US011928444B2

(12) United States Patent
Cosgrove et al.

(10) Patent No.: US 11,928,444 B2
(45) Date of Patent: Mar. 12, 2024

(54) EDITING FILES USING A PATTERN-COMPLETION ENGINE IMPLEMENTED USING A MACHINE-TRAINED MODEL

(71) Applicant: Microsoft Technology Licensing, LLC, Redmond, WA (US)

(72) Inventors: Christian Alexander Cosgrove, Stanford, CA (US); Saurabh Kumar Tiwary, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 15 days.

(21) Appl. No.: 17/721,730

(22) Filed: Apr. 15, 2022

(65) Prior Publication Data

US 2023/0333821 A1 Oct. 19, 2023

(51) Int. Cl.
*G06F 8/33* (2018.01)
(52) U.S. Cl.
CPC ...................... *G06F 8/33* (2013.01)
(58) Field of Classification Search
CPC .......................................................... G06F 8/33
USPC .................................. 717/105–120
See application file for complete search history.

(56) References Cited

U.S. PATENT DOCUMENTS

| | | | | |
|---|---|---|---|---|
| 5,991,713 | A * | 11/1999 | Unger ................. | H03M 7/3084 704/9 |
| 7,945,905 | B2 * | 5/2011 | Kumar ..................... | G06F 8/72 717/142 |
| 9,620,173 | B1 * | 4/2017 | Fay .................. | H04N 21/26258 |
| 10,361,802 | B1 * | 7/2019 | Hoffberg-Borghesani | ................. G06F 3/00 |
| 10,503,631 | B1 * | 12/2019 | Talluri ................ | G06F 11/3636 |
| 10,657,118 | B2 * | 5/2020 | Miller .................... | G06F 16/958 |
| 10,832,087 | B1 * | 11/2020 | Wang .................. | G06F 18/2163 |
| 11,060,504 | B1 * | 7/2021 | Virani .................... | G06N 20/00 |
| 11,341,191 | B2 * | 5/2022 | Von Weihe ........... | G06F 16/248 |
| 11,487,522 | B1 * | 11/2022 | Singh ......................... | G06F 8/53 |
| 11,579,868 | B1 * | 2/2023 | Zhang ....................... | G06F 8/72 |
| 11,693,637 | B1 * | 7/2023 | Singh ..................... | G06N 3/045 717/139 |

(Continued)

OTHER PUBLICATIONS

Kuschke et al, "Pattern-based Auto-completion of UML Modeling Activities", ACM, pp. 551-556 (Year: 2014).*

(Continued)

*Primary Examiner* — Anil Khatri

(57) ABSTRACT

A technique is described herein for assisting a user in editing a file. The technique involves producing current context information that includes an input message and selected file content. The input message describes a user's editing objective, while the selected file content describes a portion of the file to which the editing objective is to be applied. The technique then requests a pattern-completion engine to generate edit information based on the current context information. The edit information describes one or more changes to the selected file content that satisfy the objective of the user. The pattern-completion engine uses a machine-trained autoregressive text-completion model that is trained on revision history information. The model can be trained in a process that incorporates various tests to ensure that the edit information that is generated works as expected, satisfies various performance metrics, and fulfills the editing objectives of the user.

20 Claims, 14 Drawing Sheets

(56) References Cited

U.S. PATENT DOCUMENTS

| | | | | |
|---|---|---|---|---|
| 11,775,271 | B1* | 10/2023 | Singh | G06N 3/04 717/137 |
| 2022/0093088 | A1 | 3/2022 | Rangarajan Sridhar et al. | |
| 2022/0244952 | A1* | 8/2022 | Breslav | G06N 3/045 |
| 2022/0398071 | A1* | 12/2022 | Allamanis | G06N 3/045 |
| 2023/0336504 | A1 | 10/2023 | Cosgrove et al. | |

OTHER PUBLICATIONS

Larus et al, "EEL: Machine-Independent Executable", ACM, pp. 291-300 (Year: 1995).*

Duala-Ekoko et al, CloneTracker: Tool Support for Code Clone Management:, ACM, pp. 843-846 (Year: 2008).*

Yoon et al, "Capturing and Analyzing Low-Level Events from the Code Editor", ACM, pp. 25-30 (Year: 2011).*

Prabhu et al, "Dynamic Formatting of Source Code in Editors", IEEE, pp. 1-6 (Year: 2017).*

Put et al, "LANCET: A Nifty Code Editing Tool", ACM, pp. 75-81 (Year: 2005).*

"GitHub Copilot, Your AI pair programmer," available at https://copilot.github.com/#faq-how-does-github-copilot-work, GitHub, Inc., accessed on Mar. 4, 2022, 12 pages.

Chen, et al., "Evaluating Large Language Models Trained on Code," in arXiv repository, arXiv:2107.03374v2 [cs.LG], Jul. 14, 2021, 35 pages.

Silva, Thalles, "GitHub Copilot—A code autocomplete tool on steroids," available at https://medium.com/daitan-tech/github-copilot-a-code-autocomplete-tool-on-steroids-e513b02116ea, Medium, Sep. 8, 2021, 14 pages.

Tilgner, Aidan, "A Deep Dive Into GitHub Copilot: How GitHub Copilot works under the hood," available at https://betterprogramming.pub/ai-review-github-copilot-d43afde51a5a, BetterProgramming, Nov. 10, 2021, 20 pages.

Romero, Alberto, "GitHub Copilot—A New Generation of AI Programmers," available at https://towardsdatascience.com/github-copilot-a-new-generation-of-ai-programmers-327e3c7ef3ae, Medium, Jul. 1, 2021, 9 pages.

Brown, et al., "Language Models are Few-Shot Learners," in arXiv repository, arXiv:2005.14165v4 [cs.CL], Jul. 20, 2020, 75 pages.

"What is GPT-3, How Does It Work, and What Does It Actually Do?," available at https://medium.com/sciforce/what-is-gpt-3-how-does-it-work-and-what-does-it-actually-do-9f721d69e5c1, Medium, Sep. 17, 2021, 16 pages.

"AI Assistant for Developers & Teams," available at https://www.tabnine.com/, tabnine, accessed on Mar. 4, 2022, 11 pages.

"GitHub Copilot—First Look," available at https://www.youtube.com/watch?v=DeO7xLXORpY, screen shot from YouTube video at time mark 17:42, Jul. 29, 2021, 1 page.

"GitHub Copilot, The future of software development?," available at https://www.youtube.com/watch?v=FS_jj7Joj1w, screen shot from YouTube video at time mark 7:09, Jul. 23, 2021, 1 page.

"The Truth about Github Copilot // AI Programming First Look," available at https://www.youtube.com/watch?v=4duql8WyfqE, screen shot from YouTube video at time mark 1:00, Jun. 30, 2021, 1 page.

"Cgroups," available at https://en.wikipedia.org/wiki/Cgroups, Wikipedia article, accessed on Mar. 6, 2022, 7 pages.

"Red Hat Enterprise Linux 6 Resource Management Guide, Managing system resources on Red Hat Enterprise Linux 6," available at https://access.redhat.com/documentation/en-us/red_hat_enterprise_linux/6/pdf/resource_management_guide/red_hat_enterprise_linux-6-resource_management_guide-en-us.pdf, Red Hat, Inc., Edition 6, 2016, last updated Dec. 9, 2020, 67 pages.

"Sandbox (computer security)", available at https://en.wikipedia.org/wiki/Sandbox_(computer_security), Wikipedia article, accessed on Mar. 6, 2022, 4 pages.

Stiennon, et al., "Learning to summarize from human feedback," in arXiv repository, arXiv:2009.01325v3 [cs.CL], Feb. 15, 2022, 45 pages.

Thailappan, Dhanya, "An Introduction to Few-Shot Learning," available at https://www.analyticsvidhya.com/blog/2021/05/an-introduction-to-few-shot-learning/, Analytics Vidhya, May 1, 2021, 9 pages.

Reddy, et al., "Coqa: A Conversational Question Answering Challenge," in Transactions of the Association for Computational Linguistics, vol. 7, 2019, 18 pages.

Radford, et al., "Language Models are Unsupervised Multitask Learners," OpenAI, San Francisco, California, 2019, 24 pages.

Christiano, et al., "Deep reinforcement learning from human preferences," in arXiv repository, arXiv:1706.03741v3 [stat.ML], Jul. 13, 2017, 17 pages.

Ouyangin, et al., "Training language models to follow instructions with human feedback," in arXiv repository, arXiv:2203.02155v1 [cs.CL], Mar. 4, 2022, 68 pages.

"Git Commit," available at https://github.com/git-guides/git-commit, GitHub, Inc., accessed on Mar. 19, 2022, 6 pages.

Sennrich, et al., "Neural Machine Translation of Rare Words with Subword Units," in Cornell University arXiv repository, arXiv:1508.07909v5 [cs.CL], Jun. 10, 2016, 11 pages.

Wu, et al., "Google's Neural Machine Translation System: Bridging the Gap between Human and Machine Translation," in arXiv repository, arXiv:1609.08144v2 [cs.CL], Oct. 8, 2016, 23 pages.

Vaswani, et al., "Attention Is All You Need," in 31st Conference on Neural Information Processing Systems (NIPS 2017), 2017, 11 pages.

Phophalia, Ashish, "A Survey on Learning to Rank (LETOR) Approaches in Information Retrieval," in 2011 Nirma University International Conference on Engineering, 2011, 6 pages.

Cosgrove, et al., U.S. Appl. No. 17/721,703, filed Apr. 15, 2022, "Multimode Conversational Agent using a Pattern-Completion Engine," 72 pages.

Elgohary, et al., "NL-EDIT: Correcting Semantic Parse Errors through Natural Language Interaction," arXiv, Cornell University, arXiv:2103.14540v1 [cs.CL], Mar. 26, 2021, 11 pages.

Gunel, et al., "Supervised Contrastive Learning for Pre-trained Language Model Fine-tuning," arXiv, Cornell University, arXiv:2011.01403v1 [cs.CL], Nov. 3, 2020, 13 pages.

Wang, et al., "Entailment as Few-Shot Learner," arXiv:2104.14690v1 [cs.CL], Apr. 29, 2021, 15 pages.

PCT Search Report and Written Opinion for PCT/US2023/012073, dated May 2023, 16 pages.

PCT Search Report and Written Opinion for PCT/US2023/012067, dated Apr. 2023, 14 pages.

* cited by examiner

Selected File Content: 402

```
if not generated or ord(getch()) == 10:
    # Enter
    # Execute command in os system using bash.
    substituted_command = substitute_secrets(command,
SECRETS).strip()
    process = Popen(substituted_command, shell=True, stdout=PIPE,
stderr=PIPE)
    stdout, stderr = process.communicate()
    output = stdout or stderr  } 102
    output = output.decode('utf-8')
    if output.strip():
        output = '> ' + output.strip().replace('\n', '\n> ') + "\n"
        print(f'\033[92m{output}\033[0m')
    all_context += f"{output}\n{STOP}\n"
    command = None
```

+

Input Message: Delete the line that switches the output between stdout and stderr  404

⇩

Edition Information: 406

```
       ⎧ process = Popen(substituted_command, shell=True, stdout=PIPE,
410 ⎨   stderr=PIPE)
       ⎩ stdout, stderr = process.communicate()
408 { ⊖ output = stdout or stderr  } 102
         output = output.decode('utf-8')
         if output.strip():
```

FIG. 4

(CONTINUED FROM FIG. 4)

⇩

Revised Input Message: I meant to say delete the line with the process communicate call.     502

⇩

Revised Edit Information:     504

510 { process = Popen(substituted_command, shell=True, stdout=PIPE, stderr=PIPE)
508 { ⊖ stdout, stderr = process.communicate()
506 { ⊕ output = stdout or stderr
        output = output.decode('utf-8')
        if output.strip():

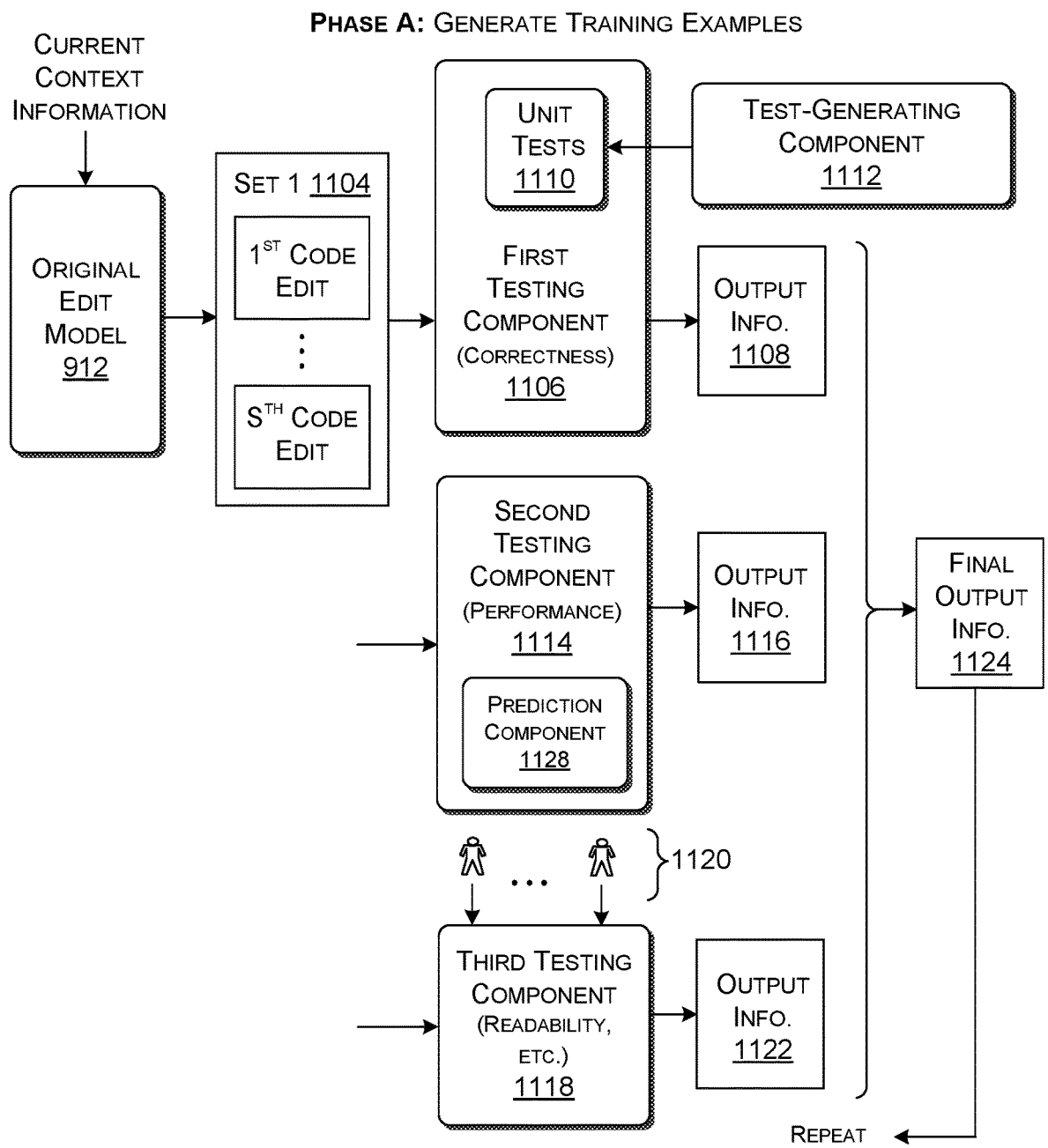
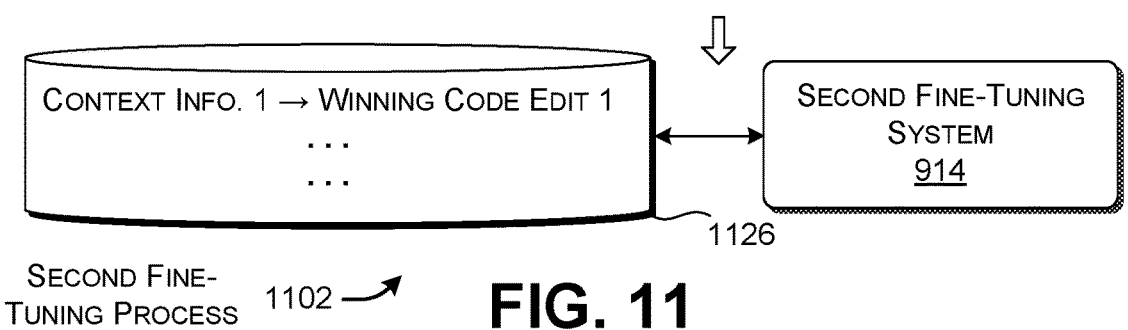
FIG. 11

ILLUSTRATIVE OPERATION OF THE TRAINING FRAMEWORK 118
1402

IN A FIRST PART OF THE TRAINING PROCESS, GENERATE A CODE-LANGUAGE MODEL BASED ON A REPOSITORY OF NATURAL LANGUAGE TRAINING EXAMPLES AND A REPOSITORY OF COMPUTER PROGRAM TRAINING EXAMPLES
1404

IN A SECOND PART OF THE TRAINING PROCESS, FINE-TUNE THE CODE-LANGUAGE MODEL BASED ON ANOTHER REPOSITORY THAT DESCRIBES REVISIONS MADE TO PLURAL FILES, TO PRODUCE AN ORIGINAL EDIT MODEL, EACH PARTICULAR REVISION IN THE REPOSITORY INCLUDING A REVISION MESSAGE THAT DESCRIBES AN OBJECTIVE OF THE PARTICULAR REVISION, AND FILE CHANGE INFORMATION THAT IMPLEMENTS THE REVISION.
1406

IN A THIRD PART OF THE TRAINING PROCESS, FURTHER REFINE THE ORIGINAL EDIT MODEL BASED ON ANOTHER REPOSITORY OF SELECTED TRAINING EXAMPLES THAT ARE DETERMINED TO SATISFY ONE OR MORE TESTS, TO PRODUCE A REVISED EDIT MODEL.
1408

| CORRECTNESS TEST(S) 1410 | PERFORMANCE-RELATED TEST(S) 1412 | TEST(S) INVOLVING HUMAN EVALUATION 1414 | ... |

FIG. 14

ILLUSTRATIVE FURTHER OPERATION OF THE AGENT SYSTEM 104
1502

EDITING FILES USING A PATTERN-COMPLETION ENGINE IMPLEMENTED USING A MACHINE-TRAINED MODEL

BACKGROUND

Program developers currently write computer programs using code-editing systems that provide various code-writing tools. While these tools are helpful, the process of developing a computer program often remains time-consuming, labor intensive, and prone to error.

SUMMARY

A computer-implemented technique is described herein for assisting a user in editing a file, such as a file that provides a computer program. In some implementations, the technique produces current context information that includes an input message and selected file content. The input message describes a user's editing objective, while the selected file content describes a portion of a file to which the editing objective is to be applied. The technique then requests a pattern-completion engine to generate edit information based on the current context information. The edit information describes one or more changes to the selected file content that satisfy the editing objective of the user.

In some implementations, the pattern-completion engine uses a machine-trained autoregressive text-completion model. The autoregressive text-completion model is trained in a training process based on revision history information. The revision history information describes revisions made to plural files. That is, each revision in the revision history information includes a revision message that describes an editing objective of the revision, and file change information that implements the particular revision.

In some implementations, the training process includes plural stages or parts. In a first part, the training process generates a code-language model based on a repository of natural language training examples and a repository of computer program training examples. In a second part, the training process fine-tunes the code-language model based on the above-described revision history information, to produce an edit model. In a third part, the training process further refines the edit model based on at least one repository of selected training examples that are determined to satisfy specified criteria. The third part increases the likelihood that the edit information generated by the pattern-completion engine will provide code that correctly performs its functions, and code that meets specified computer performance metrics.

The technique satisfies various technical objectives. For instance, the technique reduces the amount of time and labor that is required to create file content. The technique also facilitates the generation of program content that is free from errors and that satisfies various computer performance metrics.

The above-summarized technology can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 4 and 5 provide a more specific example of edit information produced by the agent system of FIG. 1.

FIG. 6 shows one implementation of a user mode component, which is one element of the agent system of FIG. 1.

FIG. 11 show a second fine-tuning process for use in the training framework of FIG. 9.

FIG. 14 is a flowchart that summarizes one manner of operation of the training framework of FIG. 9.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative agent system for assisting a user in editing file content, in cooperation with a pattern-completion engine. Section A also describes a training framework that is used to train a machine-trained model for use by the pattern-completion engine. Section B sets forth illustrative methods that explain the operation of the agent system and the training framework of Section A. And Section C describes illustrative computing functionality that can be used to implement any aspect of the features described in Sections A and B.

A. Illustrative Computing System

A.1. Overview

Figure 1:
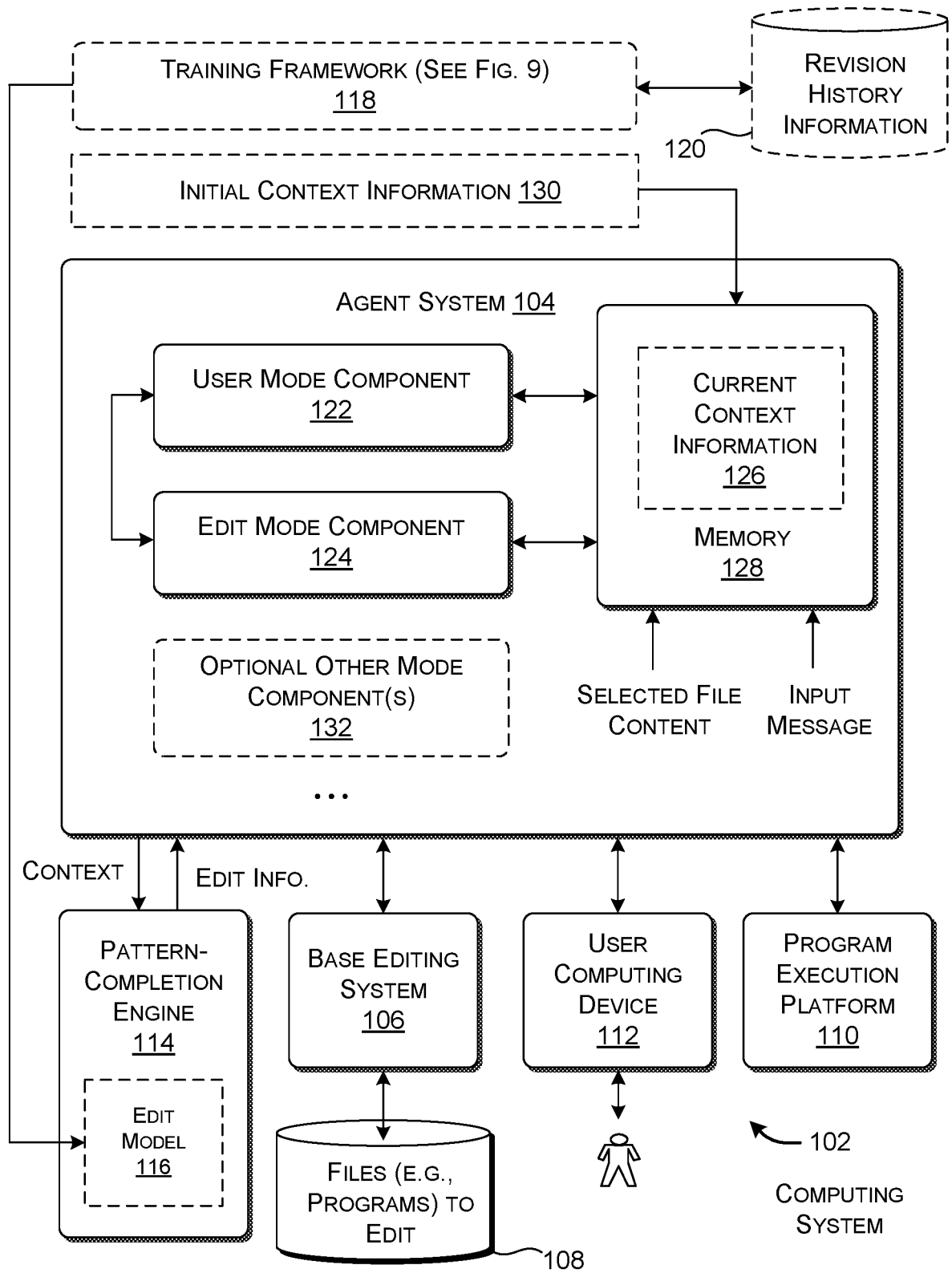
FIG. 1 shows an illustrative agent system that assists a user in editing file content, in cooperation with a pattern-completion engine.

FIG. 1 shows an illustrative computing system 102 having computer-implemented components provided at one or more sites. An agent system 104 assists a user in editing file content. The term "file content," as used herein, generally refers to any digital information stored in one or more electronic files. In some cases, file content refers to at least a portion of a computer program expressed in any programming language or combination of programming languages. In other cases, the file content corresponds to editable content produced by a word processing application, a spreadsheet application, a slide presentation application, a drawing application, and so on. To simplify explanation, most of the examples presented herein will assume that the file content under consideration is program code.

In some implementations, the agent system 104 provides its services in cooperation with a more encompassing base editing system 106. For example, the base editing system 106 can include functionality that allows a user to retrieve files from a data store 108, store files in the data store 108, manually edit the content in any selected file, compile a computer program into executable form, test the computer program by running it on a program execution platform 110, identify and fix errors in the computer program, and so on. The agent system 104 supplements the functionality of the base editing system 106 by facilitating the task editing preexisting file content. The editing performed by the user can involve adding new program content to a preexisting computer program, and/or deleting existing program content from the computer program.

The user interacts with the agent system 104 via a user computing device 112 of any type, such as a desktop computing device, a handheld computing device (e.g., a smartphone, etc.), and so on. In some implementations, the agent system 104 corresponds to a computer program that runs on the user computing device 112 itself. In other cases, the agent system 104 represents a computer program that runs on one or more servers that are remotely located with respect the user computing device 112. In still other cases, the agent system 104 represents a computer program that is distributed between the user computing device 112 and one or more remote servers. The same holds true for the base editing system 106 and the program execution platform 110. That is, any part of this functionality can be hosted in its entirety by the user computing device 112, or can be hosted in its entirety by one or more remote servers, or can be distributed between the user computing device 112 and one or more remote servers.

The agent system 104 also interacts with a pattern-completion engine 114. The pattern-completion engine 114 accepts a sequence of text tokens, and, based thereon, predicts a text token that is most likely to follow the sequence of text tokens. For example, given the incomplete fragment "The dog wouldn't know what to do if it," the pattern-completion engine 114 can predict that the text token that is most likely to follow "it" is "caught." In a subsequent prediction cycle, the pattern-completion engine 114 adds the word "caught" to the end of the previous sequence to produce "the dog wouldn't know what to do if it caught." The pattern-completion engine 114 may next predict that the word "the" is most likely to follow "caught." The pattern-completion engine 114 can continue this process until the pattern-completion engine 114 generates an end-of-sequence token, which designates the likely end to the sequence of text tokens. This mode of operation is generally referred to in the technical literature as auto-regression.

In some implementations, the pattern-completion engine 114 is implemented using a machine-trained edit model 116. A training framework 118 produces the edit model 116 in an offline training process. As will be explained at greater depth in Subsection A.2, the training framework 118 produces the edit model 116 by first generating a code-language model (not shown) based on a combination of ordinary natural language training examples and a corpus of program code training examples. For instance, an illustrative ordinary natural language training example may refer to a sentence extracted from an online article, while an illustrative program code training example may refer to a fragment of a computer program posted on the website GitHub, hosted by GitHub, Inc. of San Francisco, California, the parent organization of which is Microsoft Corporation of Redmond, Washington. In this phase of training, the training framework 118 learns the relations among tokens in ordinary natural language, and the relations among tokens in computer code. The training framework 118 also learns the relations between natural language descriptions of program instructions and the program instructions themselves. The training framework 118 achieves this last-mentioned capability by learning the correlation between comments and program instructions in different computer programs.

Next, the training framework 118 produces the edit model 116 by fine-tuning the code-language model on revision history information provided in a data store 120. The revision history information describes revisions made to plural computer programs. For instance, for a particular computer program that has undergone ten successive revisions, the revision history information describes the changes made in each of the ten revisions, relative to a preceding revision. In this phase of training, the training framework 118 specifically learns the relation between descriptive messages in the revision history information and the corresponding program changes. As will be explained in Subsection A.2, the pattern-completion engine 114 can perform additional stages of training to improve the quality of edit information produced by the edit model 116 used by the pattern-completion engine 114.

Different implementations can use different model architectures to build the pattern-completion engine 114. For example, the pattern-completion engine 114 can be implemented as a transformer-based decoder, one example of which is described below with reference to FIG. 12. In another case, the pattern-completion engine 114 can be implemented as a recurrent neural network (RNN) of any type, e.g., implemented by recursively calling a long short-term memory unit (LSTM), a gated recurrent unit (GRU), etc. The RNN can be trained using a generative adversarial network (GAN), or by some other training technique. Subsection A.3 (below) provides further details regarding one implementation of the pattern-completion engine 114.

In some implementations, the agent system 104 is configured to transition among two principal modes: a user mode and an edit mode. A user mode component 122 implements functions performed in the user mode, while an edit mode component 124 implements functions performed in the edit mode. The user mode component 122 specifically handles the task of receiving input from the user. The input has two principal parts. A first part describes a scope of file content that the user wishes to change. The term "selected file content," as used herein, refers to tokens encompassed by the scope specified by the user. A second part of the user's input describes, in natural language, the objective of the user in modifying the selected file content. The term "input message" is used herein to refer to this natural language description. The user mode component 122 then generates an instance of current context information 126 for storage in a memory 128. The current context information 126 includes tokens that make up the selected file content concatenated with tokens that make up the input message. As will be described in greater detail below, the current context information 126 can also include initial context information 130 that is useful in guiding the pattern completion engine 114 in providing useful output information.

The edit mode component 124 sends the current context information 126 to the pattern-completion engine 114. In response, the pattern-completion engine 114 uses the edit model 116 to generate edit information based on the current context information 126. As will be described in greater detail below, the edit information provides one or more program code snippets that include modifications to the selected file content. The edit mode component 124 can then present the edit information to the user for his or her inspection.

After the edit information is presented to the user, control reverts back to the user mode. If the user is satisfied with the edit information that has been presented, the user may interact with the user mode component 122 to identify another instance of selected file content, along with another input message. If the user is not satisfied with the edit information, the user may choose to interact with the user mode component 122 to enter a new input message directed to the previously-selected instance of file content.

Finally, FIG. 1 generally shows that the agent system 104 can optionally include one or more other mode components 132 that perform other functions. For instance, the agent system 104 can incorporate an answer mode component (not shown) that operates in an answer mode. The answer mode component is devoted to the task of providing responses to the user in a natural language. For example, assume that the input message provided by the user is ambiguous, which is a conclusion that the pattern-completion engine 114 can draw if the edit information that it generates has a low confidence level. In response, the answer mode component can provide a message to the user that invites the user to rephrase his or her input message. Alternatively, the answer mode component can present a directed question to the user aimed at discovering the user's intent in making a revision.

The agent system 104 provides various technical benefits. For instance, the agent system 104 expedites the task of generating a computer program and other file content. The agent system 104 also includes provisions, described below, that increase the likelihood that the edit information it generates will work correctly, will meet specified performance objectives, and will satisfy the user's intent in making a revision.

Figure 2:
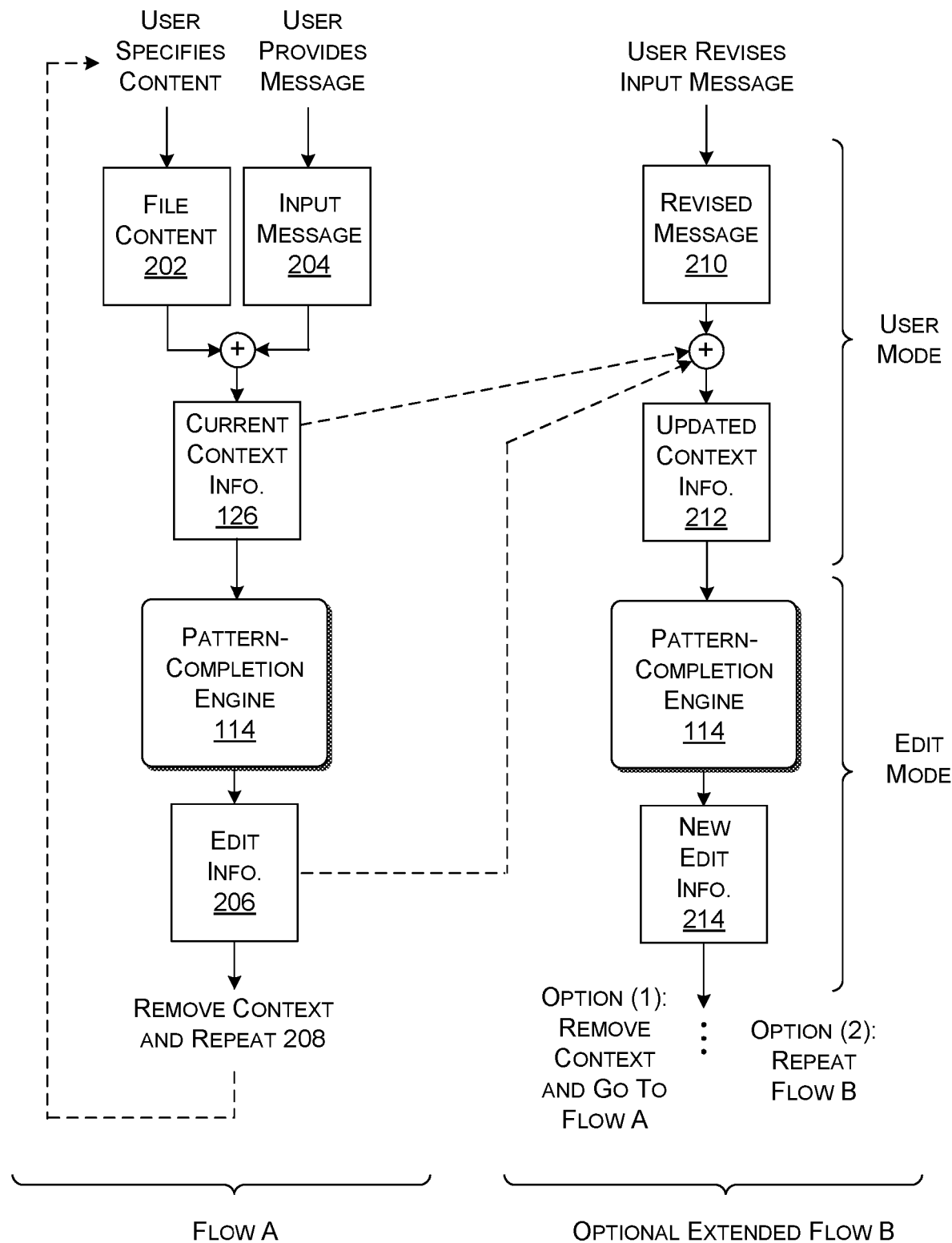
FIG. 2 shows an illustrative flow of operations performed by the agent system of FIG. 1.

FIG. 2 shows an illustrative flow of operations performed by the agent system 104 of FIG. 1. In a first processing flow (Flow A), the agent system 104 receives selected file content 202 and an input message 204. The agent system 104 concatenates the selected file content 202 with the input message 204 to produce the current context information 126. The pattern-completion engine 114 maps the current context information 126 into edit information 206. As noted above, the edit information 206 describes changes to the selected file content 202 that will carry out user's editing objectives conveyed by the input message 204.

In performing the above-described task, the edit model 116 (used by the pattern-completion engine 114) performs autoregressive text completion. That is, given input text, the edit model 116 attempts to successively produce the text tokens that have the highest likelihood of following the input text. The edit model 116 can perform this function because the training framework 118 has successfully learned the relations among text tokens that appears in training examples. Note, however, that the edit model 116 does not perform auto-completion by drawing from prior training examples in rote fashion. Rather, through its training, the edit model 116 generalizes the knowledge imparted by all of its training examples. This enables the edit model 116 to successfully complete a text fragment even though it has never encountered its complete counterpart in its training set. For instance, a training set may have including some training examples that establish that A=B, some training examples that establish B=C, and still other training examples that generally demonstrate the use of syllogistic reasoning. The edit model 116 may therefore have the ability to complete a text fragment based on the insight that A=C, even though there are no training examples in the training set that explicitly make this association. More specifically, the training framework 118 learns this kind of relationship by mapping the text items associated with A, B, and C into respective distributed vectors in a semantic vector space, and learning the relations among these vectors in the vector space.

Process operation 208 shown in FIG. 2 indicates that the user may repeat process Flow A one or more times. The user may commence each cycle of Flow A by selecting new file content and entering a new input message. The agent system 104 responds by removing the previous instance of current context information 126 from the memory 128 and adding new context information that describes the current selected file content and the current input message. In some implementations, the user mode component 122 can also allow the user to provide an explicit command to convey that he or she is starting anew with new context information. The agent system 104 will respond to this command by removing the previous instance of context information 126 from the memory 128. Alternatively, or in addition, the user mode component 122 can interpret the user's selection of new file content as an implicit indication that the previous context information is to be removed from the memory 128.

Alternatively, the user may advance to Flow B shown in FIG. 2 by modifying the previously-entered input message 204, to produce a revised input message 210. For example, assume that the selected file content is a first page of an academic paper, and the user's original input message 204 reads "Changing the font of the authors to 14 points." In response to this change, the pattern-completion engine 114 may produce edit information 206 that changes every occurrence of an author name in the first page to the selected font size. Assuming that this change is not what the user wanted, he or she could enter the revised input message that reads "No, I meant changing the font of the authors that appear in only in the heading section to 14 points."

The agent system 104 can detect that the user is revising a previous edit instruction based on one or more cues. For instance, the agent system 104 may determine that the revised input message 210 includes text that semantically indicates that the user is revising a previous input message. Illustrative key phrases that may convey this information include, "No," "To clarify, I wanted," "Sorry, I meant to say," etc. Alternatively, or in addition, the agent system 104 can conclude that the user is entering a revised input message 210 because the user has failed to enter an explicit command to remove the prior current context information 126. Alternatively, or in addition, the agent system 104 can conclude that the user is entering a revised input message 210 when the user enters the revised input message 210 without select a new instance of selected file content. In yet other implementations, the agent system 104 may accept an explicit command to convey that the input message 210 is to be understood as a continuation of the conversation started in the Flow A.

The agent system 104 responds to the user's revised input message 204 by adding it to the pre-existing current context information 126. The agent system 104 also adds the prior edit information 206 to the pre-existing current context information 126. This yields updated current context information 212. The pattern-completion engine 114 maps the updated current context information 212 to new edit information 214. If the user is now satisfied with the new edit information 214, the user may return to Flow A, whereupon the user enters a new instance of selected file content and a new input message. If the user remains dissatisfied, the user may repeat Flow B, whereupon the user enters another revised input message. FIG. 2 designates these two choices as "Option (1)" and "Option (2)," respectively. In either case, note that the agent system 104 toggles between the user mode and the edit model throughout an editing session.

The agent system 104 can correctly execute the behavior of Flow B using in-context learning. Here, the initial context information 130 can convey one or more examples of dialogues in which the user revises a prior input message. At the start of a session, the agent system 104 adds the initial context information 130 to the memory 128. Thereafter, the initial context information 130 remains a stable preamble of the current context information 126. In other words, when the user provides an implicit or explicit instruction to remove the current context information 126, the agent system 104 will remove the tokens associated with any selected file content and any input messages, but will leave the initial context information 130 intact. More broadly stated, the initial context information 130 establishes a desired pattern of dialogue. The pattern-completion engine 114 will attempt to perpetuate the same pattern of dialogue in the initial context information 130 when it is fed triggering cues that indicate that such a pattern is appropriate, e.g., as when the user enters a message that begins "No, I meant," or "Wrong, I wanted," etc.

Other implementations can extend the use of in-context learning to other dialogue scenarios. For example, the user's input message may convey that he or she wishes to extend a previous revision in some specified way, not negate the previous revision in wholesale fashion. For example, after changing the font of author names in the first page of a journal article, the user can input the message "Making the same change to the paper's title." With appropriate guidance from the initial context information 130, the pattern-completion engine 114 will synthesize the two previous input messages to produce the desired edit information. Background information on the general topic of in-context learning can be found, for instance, in Brown, et al., "Language Models are Few-Shot Learners," in Cornell University's arXiv repository, arXiv:2005.14165v4 [cs.CL], Jul. 20, 2020, 75 pages. The term "in-context learning" derives from the fact that learning is guided by text fed to a model at inference time, rather than knowledge imparted to the model during training. However, the learning that happens during training also plays a part in the ability of a model to understand a dialogue pattern exhibited at inference time.

In other implementations, the agent system 104 does not remove the current context information 126 from the memory 128 upon beginning a next pass. Rather, in both Flows A and B, the agent system 104 adds the next instance of selected file content and the next input message to the preexisting current context information 126, to produce updated context information. Here, the pattern-completion engine 114 makes the determination of how "deep" it is appropriate to look into the current context information in the course of generating the edit information. When the user's current input behavior makes it clear that the user is attempting to commence a new change, the pattern-completion engine 114 will place the most weight on the most recent selected file content and the most recent input message. But when the user's input behavior includes clues that he or she is amending a prior edit instruction, the pattern-completion engine 114 can place greater weight on instances of selected file content and input messages that precede the most recent selected file content and the most recent input message. This varied response to input conditions is learned during training. In some implementations, the agent system 104 can store no more than a prescribed maximum number of tokens in the current context information 126 at any given time. If this number is exceeded, the agent system 104 can remove a required number of preexisting tokens from the current context information 126 on a first-in-first-out basis.

Figure 3:
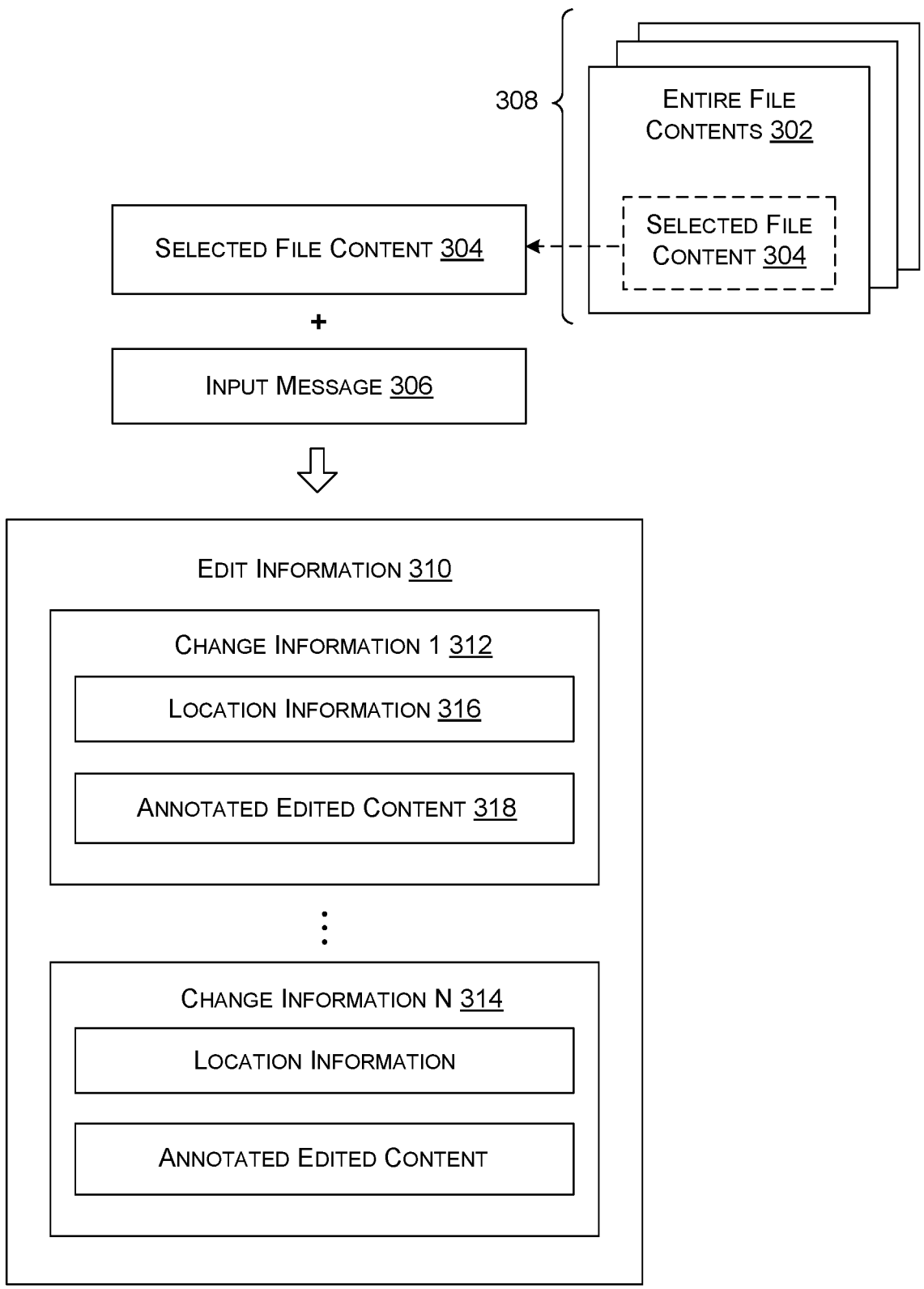
FIG. 3 shows a high-level overview of edit information produced by the agent system of FIG. 1.

FIG. 3 shows a high-level depiction of input information fed to the agent system 104, and output information generated by the agent system 104. As to the input information, the user mode component 122 determines that the user has selected a particular portion of a larger instance of file content 302 provided by a particular file. The tokens that make up this portion correspond to the selected file content 304. The user also enters an input message 306, e.g., by typing it using a keyboard, or by inputting it via microphone to a speech recognition system (not shown).

The user can identify the selected file content 304 in different ways. In some implementations, the user mode component 122 can present a user interface presentation that solicits input information from the user that designates the scope over which a change is to be made. The user may respond by designating a single file name. Alternatively, the user may respond by specifying plural file names corresponding to plural files 308. In response, the base editing system 106 opens the selected file(s). The user mode component 122 then extracts all the tokens in the file(s) and designates these tokens in aggregate as the selected file content 304.

In other implementations, the user opens a file using the base editing system 106. At any given time, the base editing system 106 presents a portion of the entire file content 302 on a user interface presentation provided by a display device of the user computing device 112. The user mode component 122 automatically designates the tokens that are presented on the user interface presentation at the current time as the selected file content 304. In other implementations, the user selects a portion of the entire file content 302 using an input device provided by the user computing device 112, such as a mouse device, a touch sensitive display mechanism that detects various kinds of region-selection gestures (e.g., two-finger selection gestures, lasso gestures, etc.). In response, the user mode component 122 designates the portion of the entire file content 302 that the user has selected as the selected file content.

In still other implementations, the user mode component 122 can use a separate machine-trained scope-determination model that maps a user's textual description of an intended editing scope to the selected file content 304. For instance, the user can provide input text that provides a natural language description of his or her intended editing scope, e.g., by providing the illustrative input text: "Second subroutine of file XYZ." The scope-determination model can map this input text to information that points to a particular preexisting file or a particular portion of a preexisting file. The user mode component 122 can then extract the tokens of the designated file or file portion, and use these tokens as the selected file content 304. Among other implementations, the user mode component 122 can implement the above-described behavior using a text-matching problem. For example, the user mode component 122 can use a machine-trained encoder to map the user's input text into a user input vector in semantic vector space. The user mode component 122 can then find the portion of preexisting content that is the closest match to the user's input text, e.g., by finding the portion of preexisting content having a vector that is closest to the user input vector in the shared vector space. Similarity among vectors can be determined in any manner, e.g., using a cosine similarity metric. The machine-trained encoder can be implemented in any manner, e.g., using a transformer-based encoder architecture.

Other implementations can use yet other mechanisms and algorithms to determine the intended scope over which edits are to be made. The above implementations are described herein as non-limiting examples.

The pattern-completion engine 114 produces edit information 310 based the current context information, which, in turn, represents the concatenation of the selected file content 304 and the input message 306. The edit information 310 generally serves as a digest that explains the changes that have been made to the selected file content 304. The edit information 310 can include one or more instances of change information (312, . . . , 314). Each instance of change information succinctly describes changes that have been made to the selected file content 304 to carry out the user's specified editing objective.

Consider the representative first instance of change information 312. The change information 312 includes any type of location information 316 that describes the location in a file at which changes are being applied. For instance, the location information 316 can include a line number in a computer program listing at which the changes are to commence. In addition, or alternatively, the location information 316 can include one or more lines of program code that precede the changes made to the computer program. The change information 312 can also include one or more lines of program code that follows the changes made to the computer program. These lines of program code help contextualize the changes made to the computer program, which assists the user in understanding the changes.

The first instance of change information 314 then provides annotated edited content 318 that describes the changes have been made. The agent system 104 can convey the changes in various ways. In some implementations, the agent system 104 can place a minus sign (-) next to any line in the original selected file content 304 that has been deleted. The agent system 104 can place a plus sign (+) next to any line that has been added to the original selected file content 304. The agent system 104 can describe a change made within any individual line by: (1) deleting the preexisting line; and (2) adding a new counterpart amended line. The agent system 104 annotates the line that has been deleted with a minus sign, and annotates the new line with a plus sign. Other implementations can use other strategies for designating changes, e.g., by showing changes in a word-level granularity, or in a character-level granularity, etc.

FIG. 4 provides a more specific example of edit information produced by the agent system of FIG. 1. An instance of selected file content 402 in this example includes a portion of a more encompassing computer program (not shown).

The user may designate the selected file content 402 in any manner specified above, e.g., by using a mouse to select a desired portion of program code presented on a user interface presentation. An input message 404 describes the intent of the user in modifying the selected file content 402. Here, the user types or speaks: "Delete the line that switches the output between stdout and stderr." By this message, the user instructs the agent system 104 to change a particular line in the selected file content 402 that performs the particular function described by the user.

In response to the current context information 126 (which represents the concatenation of the selected file content 402 and the input message 404), the pattern-completion engine 114 produces edit information 406. The edit information 406 includes a subset of the program lines in the selected file content 402 that include the change that has been made. The edit mode component 124 designates a program line 408 that has been deleted using a minus sign (-). The three program lines 410 that precede the program line 408 serve as location information that identifies the location in the selected file content 402 at which the change has been made. The two lines that follow the program line 408 also constitute location information that establishes the location at which the change has been made. Although not shown in FIG. 4, the edit mode component 124 can present additional location information, e.g., by specifying the line number in the computer program at which the changes commence.

Figures 5, 6:
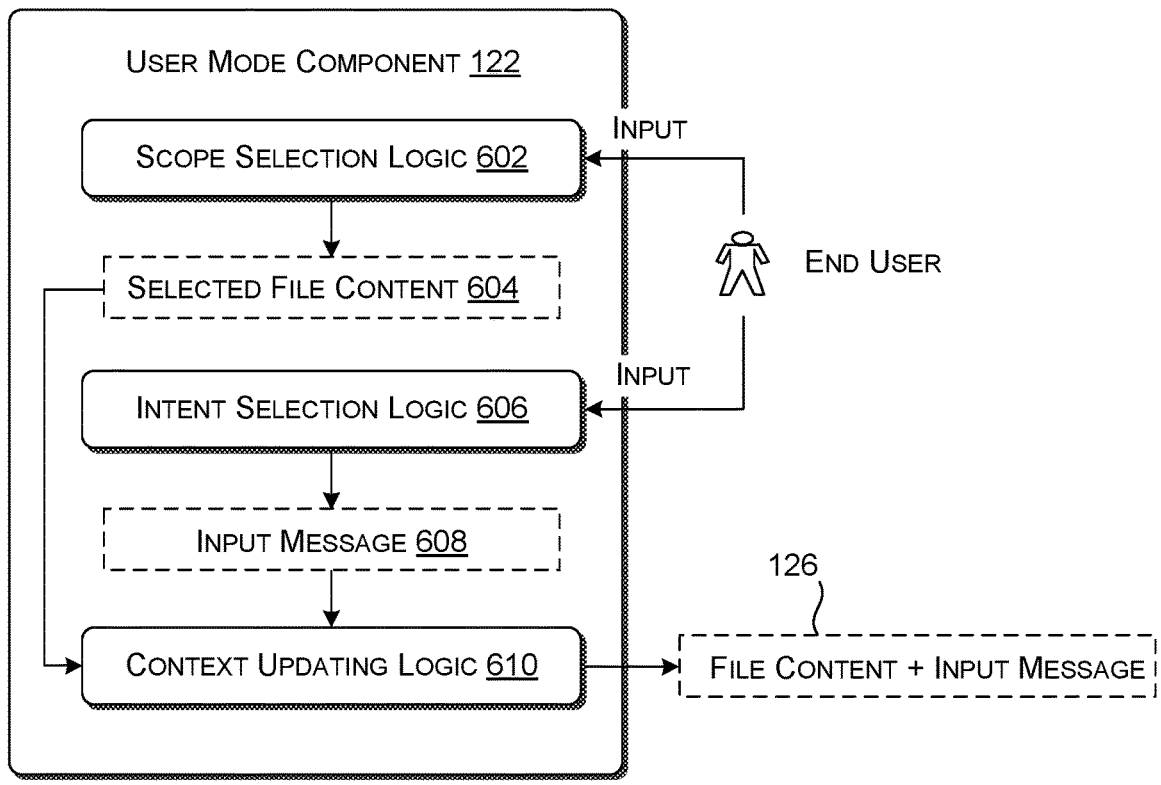

FIG. 5 shows an example in which the user advance to Path B in FIG. 2 by entering a revised input message 502 that constitutes a revision of the input message 404 of FIG. 4. Here, the revised input message reads: "I meant to say delete the line with the process communicate call." The agent system 104 detects the user's new input message 502 is a revision based on any of the triggering factors described above. In response to this new message, the user mode component 122 adds the revised input message 502 to the preexisting current content information 126 in the memory 128, to produce updated current context information. The pattern-completion engine 114 then maps the updated current context information into the revised edit information 504. The revised edit information 504 marks a program line 506 that has been added with a plus sign (+), and marks a program line 508 that is newly deleted with a minus sign (-). Note that program line 506 that is added is the program line 408 that was deleted in the previous instance of edit information 406, which is reconstituted in the revised edit information 504. The program lines 510 preceding the above-noted changes serve as location information that indicates the location at which the changes have been made.

Although not shown, the agent system 104 can store a complete snapshot of edited file content in the data store 108. For example, assume the edit information summarizes the changes made to a computer program. Upon approval from the user, the agent system 104 can store a complete version of the computer program that includes the specified changes.

FIG. 6 shows one implementation of the user mode component 122 that performs operations in the user mode. The user mode component 122 includes scope selection logic 602 that provides selected file content 604 in response to interaction with the user. The user mode component 122 includes intent selection logic 606 that provides a user input message 608 in response to interaction with the user. The scope selection logic 602 and the intent selection logic 606 can perform their respective tasks in any of the ways described above. Context-updating logic 610 updates the current context information 126 to include the tokens that make up the selected file content 604 and the input message 608.

Figure 7:
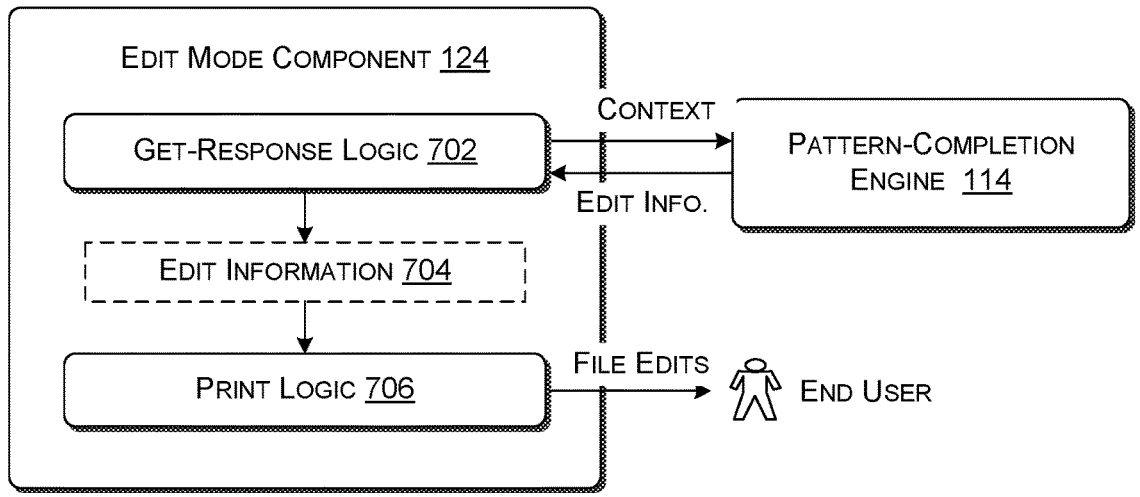
FIG. 7 shows one implementation of an edit mode component, which is another element of the agent system of FIG. 1.

FIG. 7 shows one implementation of the edit mode component 124 that performs operations in the edit mode. The edit mode component 124 includes get-response logic 702 that sends the current context information 126 to the pattern-completion engine 114. The get-response logic 702 then receives the edit information 704 generated by the pattern-completion engine 114 in response to the current context information 126. Print logic 706 displays or otherwise presents the edit information 704 to the user for his or her inspection, e.g., via a user interface presentation provided by the user computing device 112.

In some implementations, the user mode component 122 may break a user's selected file content into plural sub-parts if the user's selected file content exceeds an environment-specific number of lines. For example, assume that the user selects file content having 400 lines, whereas the maximum number of lines is 100. The user mode component 122 can break the 400-line selection into four separate parts of 100 lines each. The user mode component 122 can then associate the input message with each of the four 100-line program snippets, to produce four separate instances of current content information. The edit mode component 124 then produces an instance of edit information for each instance of current context information. The agent system 104 can aggregate the plural instances of edit information into a group, and then present the group to the user for his or her inspection.

A.2. Training Framework

Figure 8:
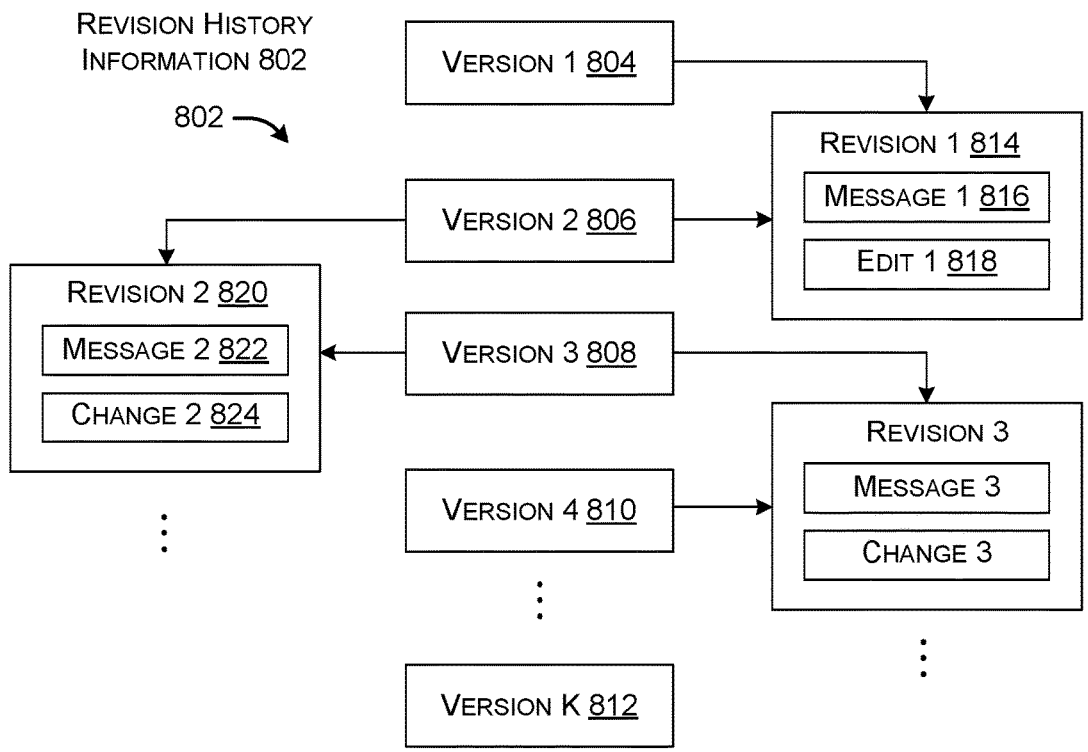
FIG. 8 shows an example of a repository of revision history information. A training framework produces a machine-trained model used by the pattern-completion engine (of FIG. 1) based on training examples derived from the repository.

Advancing to FIG. 8, this figure shows an example of revision history information 802 provided in the data store 120 (of FIG. 1) for a single file, such as a single computer program. Although not shown, the revision history information 802 includes the same kind of information shown in FIG. 8 for plural files, such as plural computer programs. The training framework 118 uses the revision history information 802, along with other information described below, to generate the edit model 116.

More specifically, the revision history information 802 shows that one or more users have created K versions (804, 806, 808, 810, . . . , 812) of a single computer program. The versions (804, . . . , 812) may be viewed as complete snapshots of the computer program that exist at different respective times. In this example, assume that the users create the versions in successive fashion, e.g., by creating the second version 806 after the first version 804, by creating the third version 808 after the second version 806, and so on. More generally, a directed graph of any complexity describes the evolution of an individual computer program. The directed graph may include plural branches corresponding to different respective paths of revision. The revision history information 802 may associate each version with an identifier that identifies it, such as a code generated by hashing the version.

In some implementations, the revision history information 802 provides revision summaries that summarize each revision that has been made. For instance, consider a first revision summary 814 that represents changes that were made to the first version 804 to produce the second version 806. The first revision summary 814 includes a revision message 816 that uses natural language to describe the changes that were made to produce the second version 806. The first revision summary 814 also includes file change information 818 that describes the actual changes that were made to produce the second version 806. In other words, the file change information 818 describes the differences between the first version 804 and the second version 806. The other revision summaries shown in FIG. 8 have the same structure and content as the first revision summary 814. For example, a second revision summary 820 describes the changes that were made to second version 806 to produce the third version 808. The second revision summary 820 includes a revision message 822 and an instance of file change information 824.

In some implementations, the training framework 118 can construct training examples drawn from instances of file change information that have no more than an environment-specific number of program lines. This provision is useful to exclude the kind of complex revisions that may be more challenging for the edit model 116 to learn and reproduce.

Figure 9:
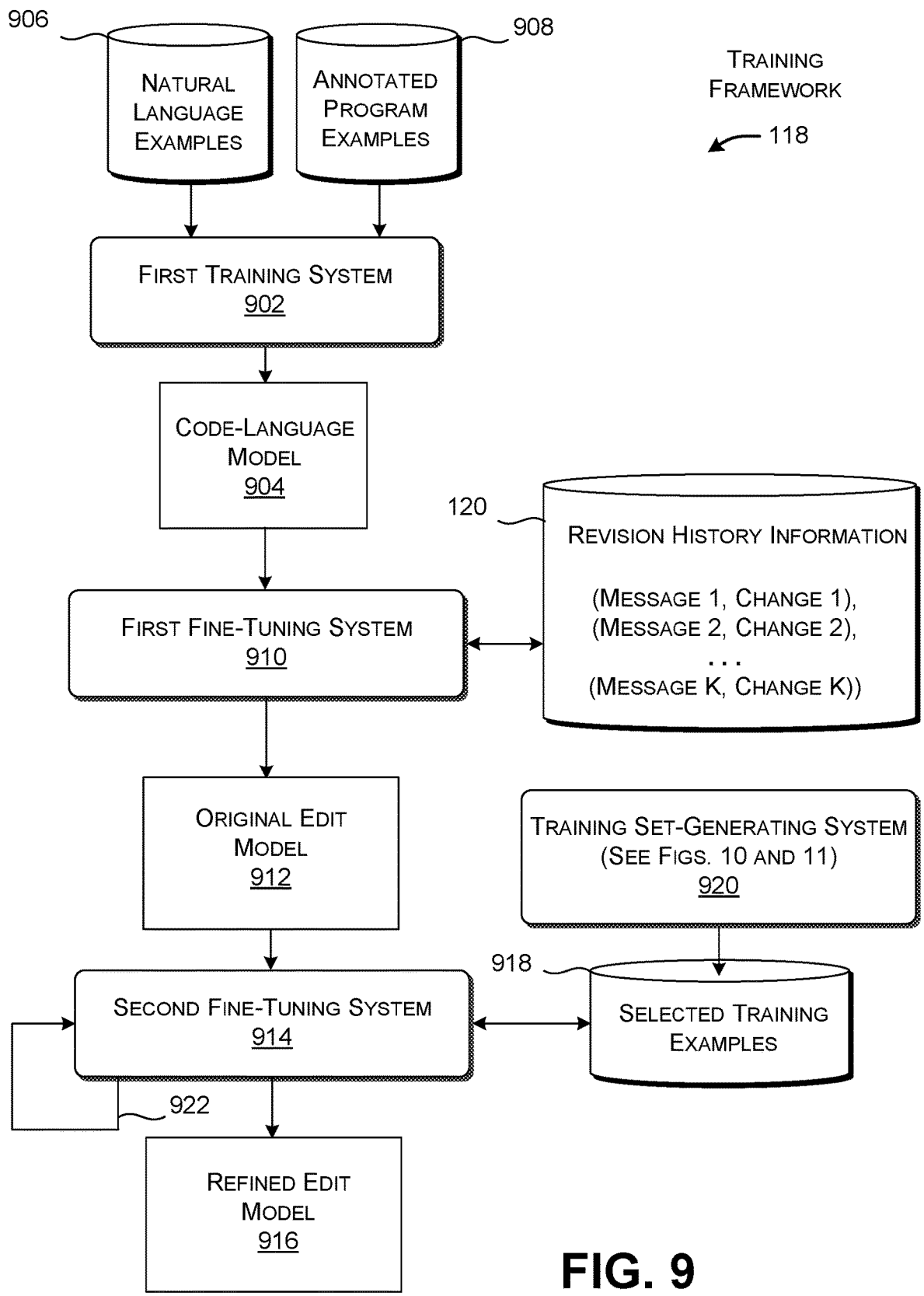
FIG. 9 shows the training framework that is used to produce the machine-trained model used by the pattern-completion engine of FIG. 1.

FIG. 9 shows the training framework 118 that produces the edit model 116 used by the pattern-completion engine 114. The training framework 118 generates the edit model 116 in a series of stages. Other implementations can combine the processing performed by the separate stages in different ways, compared to the ordering show in FIG. 9. In addition, or alternatively, other implementation can omit one or more processing stages shown in FIG. 9, such as the fine-tuning performed in the final stage (to be described below).

A first training system 902 produces a code-language model 904 based on a first subset of the training examples in a data store 906 and a second subset of training examples in a data store 908. The first subset of training examples includes natural language samples extracted from various sources, such as dialogues between human and assistants, Wikipedia articles, online blogs, online news articles, reviews, website content, etc. The second subset of training examples can include code fragments selected from computer programs obtained from any source(s), such as the above-mentioned GitHub website. A code fragment often includes a mixture of program instructions and commentary pertaining to the program instructions. Different programming languages use different telltale characters to designate comments, such as the # symbol in the Python programming language.

The first training system 902 produces the code-language model 904 by performing training on the training examples in the data stores (906, 908). In some implementations, the first training system 902 applies a training objective that successively attempts to minimize prediction errors, e.g., through backprojection and stochastic gradient descent. Consider, for instance, a particular training example that includes an incomplete sequence of tokens $(T_1, T_2, \ldots, T_N)$. The first training system 902 measures a prediction error for this particular training example by comparing a predicted next token $(T_{N+1,model})$ with a counterpart ground-truth next token $(T_{N+1,known})$ that represents the actual token that is known to follow the last token $T_N$ in the sequence. In other implementations, the first training system 902 structures its training as a reinforcement learning problem, e.g., by successively modifying a policy to increase an accumulative reward measure. The accumulative award measure is determined by summing individual reward scores assigned to individual respective predictions, in which correct predictions receive higher individual rewards than incorrect predictions.

More specifically, in some implementations, the first training system 902 can perform training on a combined training set that includes the first subset of training examples in the data store 906 (that contain natural language samples) and the second subset of training examples in the data store 908 (that contain the program code samples), to produce the code-language model 904. In other implementations, the first training system 902 can perform pre-training based on the first subset of training examples in the data store 906, to produce a pre-trained language model (not shown). The first training system 902 can then perform further training on the pre-trained language model based on the second subset of training examples, to produce the code-language model 904.

Before advancing to the next stage of the development pipeline shown in FIG. 9, it is instructive to explain the behavior of the code-language model 904 when considered as a standalone module. The code-language model 904 exhibits different behaviors depending on the kind of text that is fed to it. If fed a fragment of computer code, the code-language model 904 will auto-complete the fragment, to provide one or more completed lines of program code, or perhaps an entire program. When fed a high-level description of a programming objective, the code-language model 904 generates one or more lines of completed program code, or perhaps an entire program. The code-language model 904 can perform this description-to-code translation task because the first training system 902 has learned the relation between comments and program instructions that appear in program fragments in the code training examples. In still other contexts, a user can enter ordinary text to the code-language model 904 that contains no telltale content to indicate that it pertains to program code. For instance, the ordinary text may correspond to a fragment of a natural language sentence used to convey information from one human to another human. The code-language model 904 may complete the sequence of ordinary text tokens by adding more ordinary text tokens until a stop character is encountered.

In a next stage, a first fine-tuning system 910 fine-tunes the code-language model 904 based on revision history information in the data store 120, to produce an original edit model 912. As previously described with reference to FIG. 8, the revision history information identifies revisions made to a plurality of files. Each revision includes a revision message that uses natural language to describe the changes that were made in the revision, together with file change information that describes the actual modifications that were made. The first fine-tuning system 910 constructs training examples from the revision history information. Each such training example maps an instance of current context information to edit information. The first fine-tuning system 910 performs training in the same manner described above with respect to the first training system 902. That is, the first fine-tuning system 910 adjusts the weights of the code-language model 904 to iteratively reduce errors in predicting instances of edit information, given instances of selected file content and input messages.

Note that the first training system 902 produces the code-language model 904 by drawing its training examples from only the last versions of respective computer programs, such as the single version K 812 for the computer program shown in FIG. 1. It mines the relations expressed among tokens, not the relations across tokens in different versions. The first fine-tuning system 910 differs because it draws examples, for each particular computer program, from the differences between successive versions. This means that code-language model 904 by itself would not be successful in creating edit information.

In some implementations, the development pipeline ends at this juncture. That is, the pattern-completion engine 114 uses the original edit model 912 produced by the first fine-tuning system 910. In other implementations, a second fine-tuning system 914 further fine-tunes the original edit model 912, to produce a refined edit model 916. The pattern-completion engine 114 will then use the refined edit model 916.

More specifically, the second fine-tuning system 914 further refines the weights of the original edit model 912 based on a set of selected training examples provided in a data store 918. A training set-generating system ("set-generating system" for brevity) 920 produces the selected training examples. From a high-level perspective, the set-generating system 920 selects training examples that are determined to meet one or more tests. The test(s) increase the likelihood that the pattern-completion engine 114 will produce instances of edit information that correctly perform their purported functions, and/or meet one or more pre-scribed computer performance metrics, and/or satisfy criteria identified by one or more human evaluators. The selected training examples may be regarded as "amplified" training examples because they are specifically chosen to help the second fine-tuning system 914 learn how to produce useful edit information, compared to those training examples that are not required to satisfy heighted criteria of usefulness. The second fine-tuning system 914 otherwise performs fine-tuning in the same manner as the first fine-tuning system 910. That is, the second fine-tuning system 914 iteratively adjusts the weights of the original edit model 912 to reduce errors in predicting instances of edit information, given corresponding instances of context information. A loop 922 indicates that the second fine-tuning system 914 can perform its fine-tuning in a series of stages, e.g., by fine-tuning according to a first criterion, and then fine-tuning according to a second criterion, etc.

Figure 10:
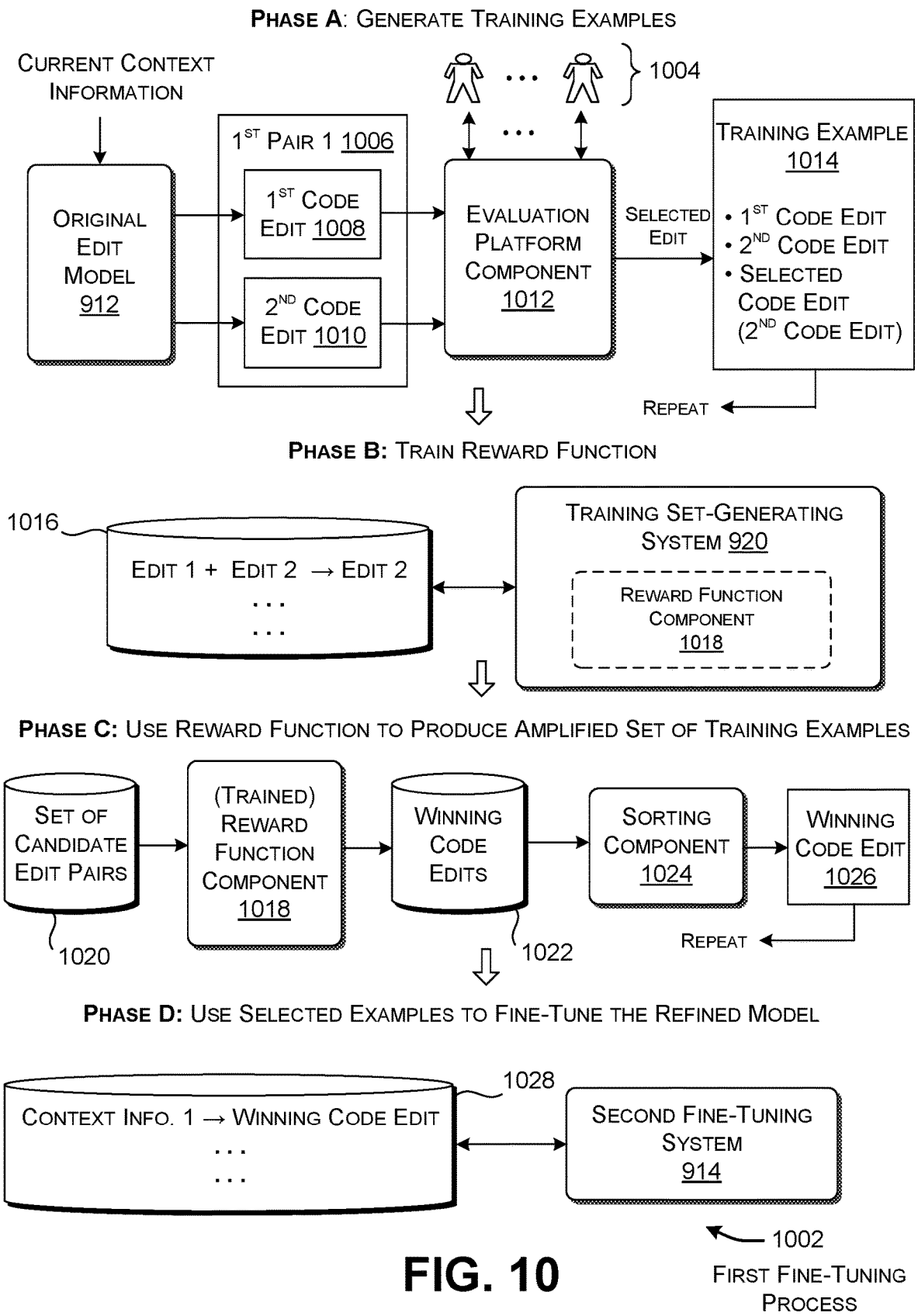
FIG. 10 shows a first fine-tuning process for use in the training framework of FIG. 9.

FIG. 10 shows a fine-tuning process 1002 for use by the second fine-tuning system 914 that takes into account human evaluations. In a first phase (Phase A), the set-generating system 920 uses any code-language model (or the original edit model 912 itself) to generate a plurality of evaluated pairs of instances of edit information, with the assistance of one or more human evaluators 1004. The instances of edit information are referred to below as "code edits" for brevity. Each code edit describes a change made to a computer program to achieve a particular revision. FIG. 10 specifically illustrates the process of Phase A with respect to one such representative pair 1006.

As a first operation, the original edit model 912 maps an instance of content information to two different code edits (1008, 1010). The current content information includes a particular instance of selected file content concatenated with a particular revision message. The original edit model 912 is capable of generating two different code edits (1008, 1010) because it uses a temperature parameter T having a non-zero positive value. In other words, this setting of the temperature parameter T introduces randomness in the edit information generated by the original edit model 912. Further information regarding the temperature parameter T appears in the next subsection (A.3).

The human evaluator(s) 1004 review both code edits via an evaluation platform system 1012, and then choose the code edit that most effectively expresses the intent underlying the revision message. A human evaluator can use any criteria to make his or her decisions. For example, a human evaluator may choose the code edit that most directly and correctly carries out the presumed intent underlying the revision message with the fewest lines of code. In other cases, a human evaluator may choose the code edit that is most readable, understandable, etc.

The set-generating system 920 next generates a training example 1014 that summarizes the selection made by the human evaluator(s) 1004. The training example 1014 includes the tokens of the first code edit 1008 concatenated with the tokens of the second code edit 1010. The training example 1014 also includes an indication of the code edit that has been chosen by the human evaluator(s) 1004. Assume here that the evaluator(s) 1004 have selected the second code edit 1010. In that case, the training example 1014 will include some information to indicate that the second option has been selected. Over the course of the first phase, the set-generating system 920 generates plural training examples of this nature for plural generated pairs of code edits. A data store 1016 stores the training examples.

In a second phase (Phase B), the set-generating system 920 trains a reward function component 1018 based on the above-described training examples in the data store 1016. In some implementations, the reward function component 1018 is an autoregressive text-completion model. In some implementations, the reward function component 1018 more specifically represents a trainable facet of the original edit model 912 itself. In that case, the set-generating system 920 trains the reward function component 1018 to "complete" a sequence of tokens representing two code edits with one or more text tokens that correctly designate a winning selected code edit. Other implementations can use other machine-trained models to implement the reward function component 1018, such as any binary classifier (e.g., a transformer-based classifier).

In a third phase (Phase C), the set-generating system 920 formulates a plurality of pairs of code edits. The set-generating system 920 can perform this task by presenting a same revision message to the original edit model 912 and asking it to generate a plurality of pairs of code edits for the input message. The set-generating system 920 specifically generates pairs of edits such that a member of each pair intersects with a member of at least one other pair. For example, a first pair of code edits may compare a code edit A with a code edit B, a second pair of code edits may compare the code edit B with a code edit C, and so on. A data store 1020 stores these pairs of code edits.

For each pair of code edits in the data store 1020, the set-generating system 920 then uses the trained reward function component 1018 to select a winning code edit. Again, the trained reward function component 1018 performs this task by completing a sequence of tokens associated with the two pairs of code edits with one or more tokens that designate a selected code edit. For each pair, a data store 1022 stores the selected code edit. A sorting component 1024 next performs pair-wise comparison among the pairs to select a winning code edit 1026. For example, if the data store 1022 indicates that the code edit A is better than the code edit B, and the code edit C is better than the code edit B, then the sorting algorithm will choose the code edit C from among these three choices as the winning code edit. The set-generating system 920 repeats the above-described tasks for a plurality of sets of edit pairs associated with a plurality of instances of current context information, to produce a plurality of training examples. A data store 1028 stores these training examples. Each training example includes an instance of current context information that was used to produce a particular set of edit pairs, and a winning code edit selected by the sorting component 1024 among the set.

In a fourth stage (Phase D), the second fine-tuning system 914 fine-tunes the original edit model 912 based on the training examples in the data store 1028, to produce the refined edit model 916. Overall, the second fine-tuning system 914 increases the probability that the refined edit model 916 will select an instance of edit information that the human evaluator(s) 1004 might have selected. That is, the first fine-tuning process 1002 shown in FIG. 10 has the effect of producing a refined edit model 916 that more effectively mirrors the intent expressed by the human evaluator(s) 1004, compared to the original edit model 912.

FIG. 11 shows a second fine-tuning process 1102 for use by the second fine-tuning system 914. Overall, the second fine-tuning process 1102 leverages results generated by one or more tests to improve the quality of edit information produced by the refined edit model 916. In a first phase (Phase A), the set-generating system 920 produces a plurality of winning code edits that satisfy the tests. FIG. 11 illustrates the first phase with respect to processing performed for a single instance of current context information. To begin with, the set-generating system 920 uses a code-language model (or the original edit model 912 itself) to generate a set 1104 of S code edits for a given instance of current context information, where S≥2. To repeat, the original edit model 912 is capable of performing this function by virtue of the fact that the temperature parameter T (described below) is set to a positive non-zero value.

A first testing component 1106 verifies whether each code edit in the set 1104 correctly performs its functions, with respect to predetermined expectations of what constitutes the expected behavior of these functions. The first testing component 1106 can perform this function by applying a plurality of unit tests 1110 to each code edit in the set 1104. The first testing component 1106 concludes that a code edit under consideration correctly performs its functions when the code edit passes all of its unit tests 1110. Generally, unit testing involves: (1) identifying the operations performed by a code fragment, with the goal of breaking the code fragment into its smallest testable parts; (2) generating assertions that will be used to determine whether each identified operation produces correct or incorrect results; and (3) applying all of the unit tests to the code fragment under consideration. The first testing component 1106 produces output results 1108 that identify the subset of code edits (if any) that pass the above-described type of testing.

Note that the code edits generated by the original edit model 912 are synthetic, not drawn from a repository of actual code edits produced by human developers. This further means that preexisting unit tests are unlikely to exist for the code edits generated by the original edit model 912. To remedy this deficiency, a test-generating component 1112 can use any type of machine-trained model (not shown) to automatically produce the unit tests 1110 for the code edits. For instance, the test-generating component 1112 can implement this function via a trained facet of any code-language model, or the original edit model 912 itself. Through its training, the test-generating component 1112 learns to predict the tokens associated with the unit tests 1110 that are expected to follow the tokens associated with a code edit under consideration.

More specifically, consider the case in which the test-generating component 1112 uses the original edit model 912 to generate the unit tests. The test-generating component 1112 can train the original edit model 912 to perform this function by performing training on a set of code edits and associated unit tests generated by human developers. Through this training, the original edit model 912 learns to map a given code edit to a set of unit tests that can be applied to the code edit to test its operations. In addition, or alternatively, the test-generating component 1112 can produce initial context information that contains one or more examples of the type of code-to-test mapping expected from the original edit model 912. The original edit model 912 is induced to repeat the pattern of dialogue expressed in the initial context information through in-context learning.

A second testing component 1114 applies one or more performance-based tests on the code edits in the set 1104, to produce output information 1116 that specifies a subset of the code edits (if any) that satisfy the performance-based tests. For example, a latency-based test determines whether a code edit under consideration executes its functions within an environment-specific amount of time. A memory utilization test determine whether a code edit under consideration takes more than an environment-specific amount of memory to store and/or run. The output information 1116 identifies the code edits that satisfy all of the performance-based tests.

Alternatively, or in addition, the second testing component 1114 ranks the code edits in the set 1104 based on their latency-related performance, and selects one or more code edits having the most favorable latency-related performance. Similarly, the second testing component 1114 ranks the code edits in the set 1104 based on their memory utilization, and selects one or more code edits that consume the least amount of memory. The second testing component 1114 can then generate a score for each code edit based on a weighted sum of its latency-related performance and memory-utilization performance. The second testing component 1114 then selects the code edit having the most favorable score.

An optional third testing component 1118 relies on one or more human evaluators 1120 to choose the most favorable code edit in the set 1104 based on any criteria, such as code readability, code understandability, the application of good coding practices, etc. The third testing component 1118 generates output information 1122 that identifies one or more code edits selected by the human evaluator(s) 1120 from the set 1104. The third testing component 1118 is characterized as optional because the insight captured by the third testing component 1118 may overlap, at least in part, with the knowledge gained via the first fine-tuning process 1002 of FIG. 10.

The set-generating system 920 then generates final output information 1124 that identifies one or more code edits (if any) that most effectively satisfy all of the above-described tests. In some implementations, the set-generating system 920 can determine the winning code edits by forming an intersection of the output information generated by the individual tests. As a result of this intersection, the final output information 1124 includes only code edits that satisfy all of the individual tests. In other cases, the set-generating system 920 can score each code edit based on the extent to which it satisfies each test. The set-generating system 920 can then select one or more code edits (if any) that have the most favorable scores.

The set-generating system 920 repeats the above-described testing for a plurality of sets of code edits associated with corresponding instances of current context information. A data store 1126 stores training examples that reflect the output results of the above-described processing. Each training example identifies an instance of current context information and a code edit that most effectively satisfies the tests described above. In those cases in which two or more code edits equally satisfy the tests, the set-generating system 920 can randomly select one of the best-performing code edits.

In a second phase (Phase B), the second fine-tuning system 914 fine-tunes the original edit model 912 based on the training examples in the data store 1126, to produce the refined edit model 916. The second fine-tuning system 914 system increases the probability that the refined edit model 916 will select an instance of edit information that satisfies the above-described tests.

Referring back to the second testing component 1114, one way to determine the performance of a code edit under consideration is to actually measure its performance. For example, for a latency-based performance metric, the second testing component 1114 can run a code edit a prescribed number of times, and then measure the average amount of time the code edit takes to perform its function. With respect to a memory utilization performance metric, the second testing component 1114 can measure the amount of memory that is required to actually load and run a code edit. This manner of operation may be feasible for many code edits, but may negatively impact the performance of the testing framework 118 for some resource-intensive code edits. These types of code edits require a significant amount of time to run and/or may require a significant amount of computing resources (process, memory, etc.) to run.

To address the above processing challenge, the second testing component 1114 may use a prediction component 1128 that simulates the performance of a code edit under consideration. The set-generating system 920 can train the prediction component 1128 based on training examples that identify the measured performance of a plurality of code edits. More specifically, consider training performed with respect to latency. The set-generating system 920 can measure the latency for each code edit in a group of code edits. The set-generating system 920 can then produce a training set that pairs each code edit with its latency performance. The set-generating system 920 can then train the prediction component 1128 to duplicate the learned correlation between code edits and latency performance.

The set-generating system 920 can use any type of prediction model to capture the correlation between code edits and performance results. In some implementations, the set-generating system 920 trains a code-language model (or the original edit model 912 itself) to perform this function. When trained, the prediction model is presented with the tokens associated with a code edit under consideration. In response, the prediction model generates one or more next tokens that identify the latency of the code edit. The prediction component 1128 can be guided to perform this behavior based on example dialogues in the initial context information. Alternatively, the set-generating system 920 can train a code-language model to perform the more limited task of predicting which member of a pair of code edits will have the lowest latency, again, as guided by in-context learning. In the same manner described above (for Phase C of FIG. 10), the set-generating system 920 can then use a sorting algorithm to select code edits in the set 1104 that have the most favorable latency. Other implementations can use other types of models to implement the prediction component 1128 besides autoregressive test-completion models, such as a transformer-based encoder having a top-layer classifier.

This subsection set forth a training process for producing the refined edit model 916 in a plurality of successive stages. As noted above, other implementations can combine the operations in different ways, and/or can omit one or more of the operations described in this subsection. For example, other implementations can use a training system that directly produces the original edit model 912 based on natural language examples, annotated program examples, and revision history information. That is, these implementations can omit the preliminary operation of generating an application-agnostic code-language model 904. Alternatively, or in addition, other implementations can use a single fine-tuning system that performs the roles attributed to the first fine-tuning system 910 and the second fine-tuning system 914. Still other modifications are possible. Generally, any reference to a "part" of a training process herein does not suggest that the designated part is performed separately from another part of the training process.

Further note that latency and code utilization were cited as two performance metrics that can play a role in generating selected tests in the second fine-tuning process 1102 of FIG. 11. Other implementations can take into consideration other computer performance metrics, such as code size, error rate, bandwidth utilization, power consumption, privacy, safety (e.g., security), etc.

A.3. The Pattern-Completion Engine

Figure 12:
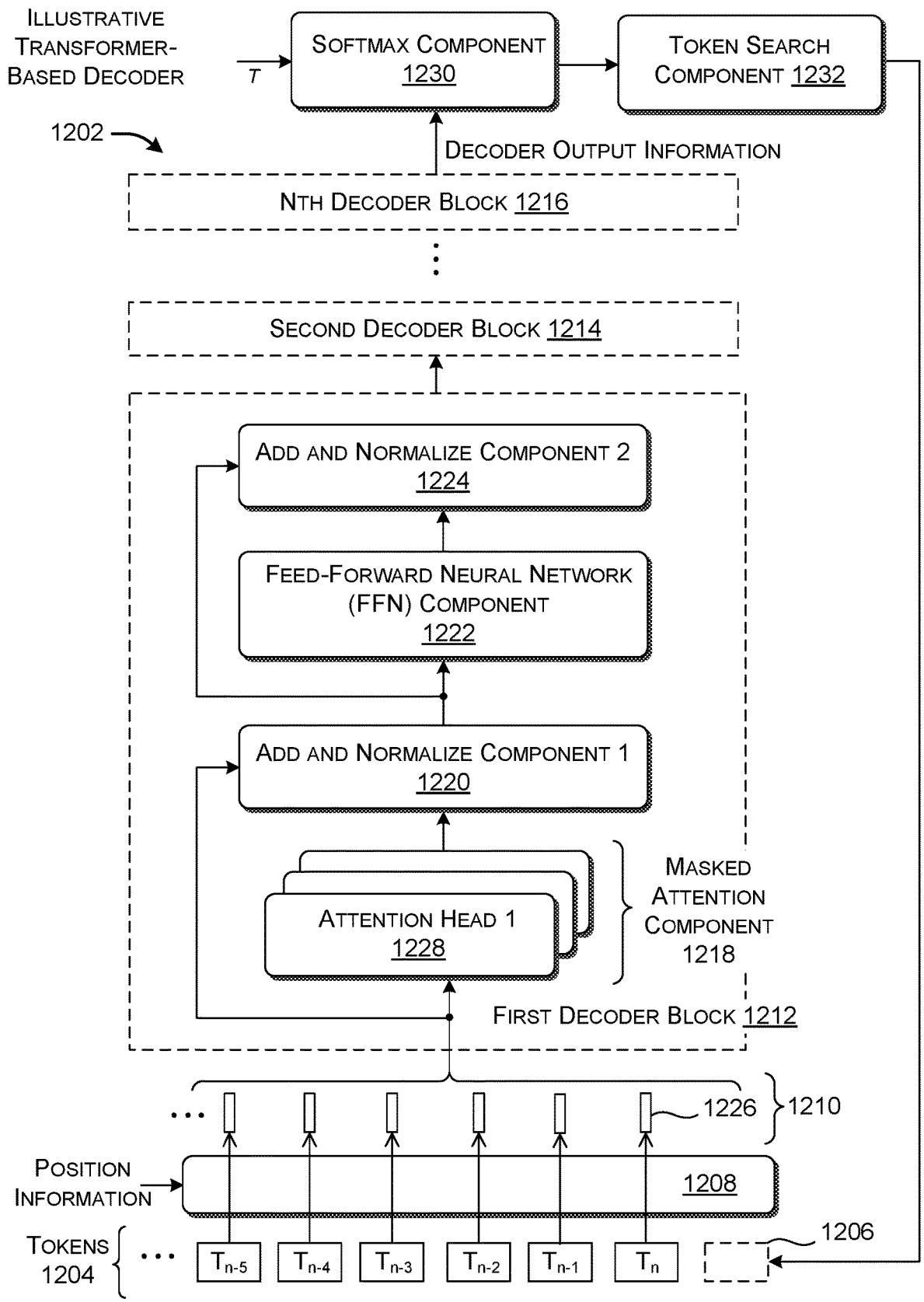
FIG. 12 shows a transformer-based decoder, which serves as one implementation of the pattern-completion engine of FIG. 1.

FIG. 12 shows a transformer-based decoder ("decoder") 1202, which is one kind of neural network that can be used as the pattern-completion engine 114 of FIG. 1. The decoder 1202 includes a pipeline of stages that map a sequence of input tokens 1204 to at least one output token 1206. The decoder 1202 appends the output token 1206 to the end of the sequence of input tokens 1204, to provide an updated sequence of tokens. In a next pass, the decoder 1202 processes the updated sequence of tokens to generate a next output token. The decoder 1202 repeats the above process until the decoder 1202 generates a specified stop token. As used herein, a "token" or "text token" refers to a unit of text having any granularity, such as an individual word, a word fragment produced by byte pair encoding (BPE), a character n-gram, a word fragment identified by the WordPiece algorithm, etc. To facilitate explanation, assume that each token corresponds to a complete word. The WordPiece algorithm is a well-known tokenization technique described, for instance, in Wu, et al., "Google's Neural Machine Translation System: Bridging the Gap between Human and Machine Translation," in Cornell University's arXiv repository, arXiv:1609.08144v2 [cs.CL], Oct. 8, 2016, 23 pages. Byte pair encoding is another tokenization technique described, for instance, in Sennrich, et al., "Neural Machine Translation of Rare Words with Subword Units," in Cornell University's arXiv repository, arXiv:1508.07909v5 [cs.CL], Jun. 10, 2016, 11 pages.

The pipeline of stages includes an embedding component 1208 that maps the sequence of tokens 1204 into respective embedding vectors 1210. For example, the embedding component 1208 can produce one-hot vectors that describe the tokens, and can then map the one-hot vectors into the embedding vectors 1210 using a machine-trained linear transformation. The embedding component 1208 can then add position information to the respective embedding vectors 1210, to produce position-supplemented embedded vectors. The position information added to each embedding vector describes the embedding vector's position in the sequence of embedding vectors 1210.

A series of decoder blocks (1212, 1214, . . . , 1216) process the output of the embedding component 1208, with each decoder block receiving its input information from a preceding decoder block (if any). FIG. 12 describes a representative architecture of the first decoder block 1212. Although not shown, other decoder blocks share the same architecture as the first decoder block 1212.

The decoder block 1212 includes, in order, an attention component 1218, an add-and-normalize component 1220, a feed-forward neural network (FFN) component 1222, and a second add-and-normalize component 1224. The attention component 1218 performs masked attention analysis using the following equation:

$$attn(Q, K, V) = \text{softmax}\left(\frac{QK^T}{\sqrt{d}}\right)V. \quad (1)$$

The attention component 1218 produces query information Q by multiplying a position-supplemented embedded vector 1226 for a last-introduced token ($T_n$) in the sequence of tokens 1204 by a query weighting matrix $W^Q$. The attention component 1218 produces key information K and value information V by multiplying the position-supplemented embedding vectors associated with the entire sequence of tokens 1204 by a key weighting matrix $W^K$ and a value weighting matrix $W^V$, respectively. To execute Equation (1), the attention component 1218 takes the dot product of Q with the transpose of K, and then divides the dot product by a scaling factor $\sqrt{d}$, to produce a scaled result The symbol d represents the dimensionality of the transformer-based decoder 1202. The attention component 1218 takes the Softmax (normalized exponential function) of the scaled result, and then multiples the result of the Softmax operation by V, to produce attention output information. More generally stated, the attention component 1218 determines the importance of each input vector under consideration with respect to every other input vector. The attention component 1218 is said to perform masked attention insofar as the attention component 1218 masks output token information that, at any given time, has not yet been determined. Background information regarding the general concept of attention is provided in above-identified paper by Vaswani, et al., "Attention Is All You Need," in 31st Conference on Neural Information Processing Systems (NIPS 2017), 2017, 11 pages.

Note that FIG. 12 shows that the attention component 1218 is composed of plural attention heads, including a representative attention head 1228. Each attention head performs the computations specified by Equation (1), but with respect to a particular representational subspace that is different than the subspaces of the other attention heads. To accomplish this operation, the attention heads perform the computations using different respective sets of query, key, and value weight matrices. Although not shown, the attention component 1218 can concatenate the output results of the attention component's separate attention heads, and then multiply the results of this concatenation by another weight matrix $W^O$.

The add-and-normalize component 1220 includes a residual connection that combines (e.g., sums) input information fed to the attention component 1218 with the output information generated by the attention component 1218. The add-and-normalize component 1220 then performs a layer normalization operation on the output information generated by of the residual connection, e.g., by normalizing values in the output information based on the mean and standard deviation of those values. The other add-and-normalize component 1224 performs the same functions as the first-mentioned add-and-normalize component 1220.

The FFN component 1222 transforms input information to output information using a feed-forward neural network having any number of layers. In some implementations, the FFN component 1222 is a two-layer network that performs its function using the following equation:

$$FNN(x) = \max(0, xW_{fnn1} + b_1)W_{fnn2} + b_2 \quad (2).$$

The symbols $W_{fnn1}$ and $W_{fnn2}$ refer to two weight matrices used by the FFN component 1222, having reciprocal shapes of (d, $d_{fnn}$) and ($d_{fnn}$, d), respectively. The symbols $b_1$ and $b_2$ represent bias values.

A Softmax component 1230 can use a combination of a linear transformation operation and the Softmax function to map output information generated by the Nth decoder block 1216 into a probability distribution. The probability distribution identifies the probability associated with each token in an identified vocabulary. More specifically, the Softmax component computes the probability of a candidate token $q_i$ as $(\exp(z_i/T))/(\Sigma_i \exp(z_i/T))$, where $z_i$ is a corresponding value in the output information generated by the Nth decoder block 1216, and T is a temperature parameter that controls the degree of randomness exhibited by the Softmax function. By setting the temperature parameter T to a non-zero value, the agent system 104 ensures that the decoder 1202 will generate different instances of edit information when repeatedly fed a same instance of current context information 126.

A token search component 1232 selects at least one token based on the probability distribution generated by the Softmax component 1230. More specifically, in a greedy search heuristic, the token search component 1232 selects the token having the highest probability for each decoder pass. In a beam search heuristic, for each decoder pass, the token search component 1232 selects a set of tokens having the highest conditional probabilities, e.g., by selecting the three tokens with the highest conditional probabilities when the beam width is set to 3. To compute the conditional probability of a particular token under consideration, the token search component 1232 identifies the search path through a search space that was used to reach the token under consideration. The token search component 1232 computes the conditional probability of the token under consideration based on a combination of the probabilities of the tokens along the search path. In a next pass, the transformer-based decoder 1202 applies the above-described pipeline of decoder operations to each token in the set of tokens generated by the beam search heuristic in the preceding pass.

Other implementations of the pattern-completion engine 114 can use other kinds of neural network architectures compared to the transformer-based decoder 1202 shown in FIG. 12. For instance, other implementations of the pattern-completion engine 114 can use an RNN architecture that uses a recursively-called LSTM unit. In addition, or alternatively, other implementations of the pattern-completion engine 114 can use other model paradigms to select output tokens, compared to the sequence-based model paradigm used by the transformer-based decoder 1202 of FIG. 12. For instance, other implementations can use a machine-trained ranking model to select the most likely intent expressed by the current context information 126. These implementations can then map the selected intent to one or more output tokens. Background information on the general topic of ranking models can be found in Phophalia, Ashish, "A Survey on Learning To Rank (LETOR) Approaches in Information Retrieval," in 2011 Nirma University International Conference on Engineering, 2011, pp. 1-6.

B. Illustrative Processes

Figure 13:
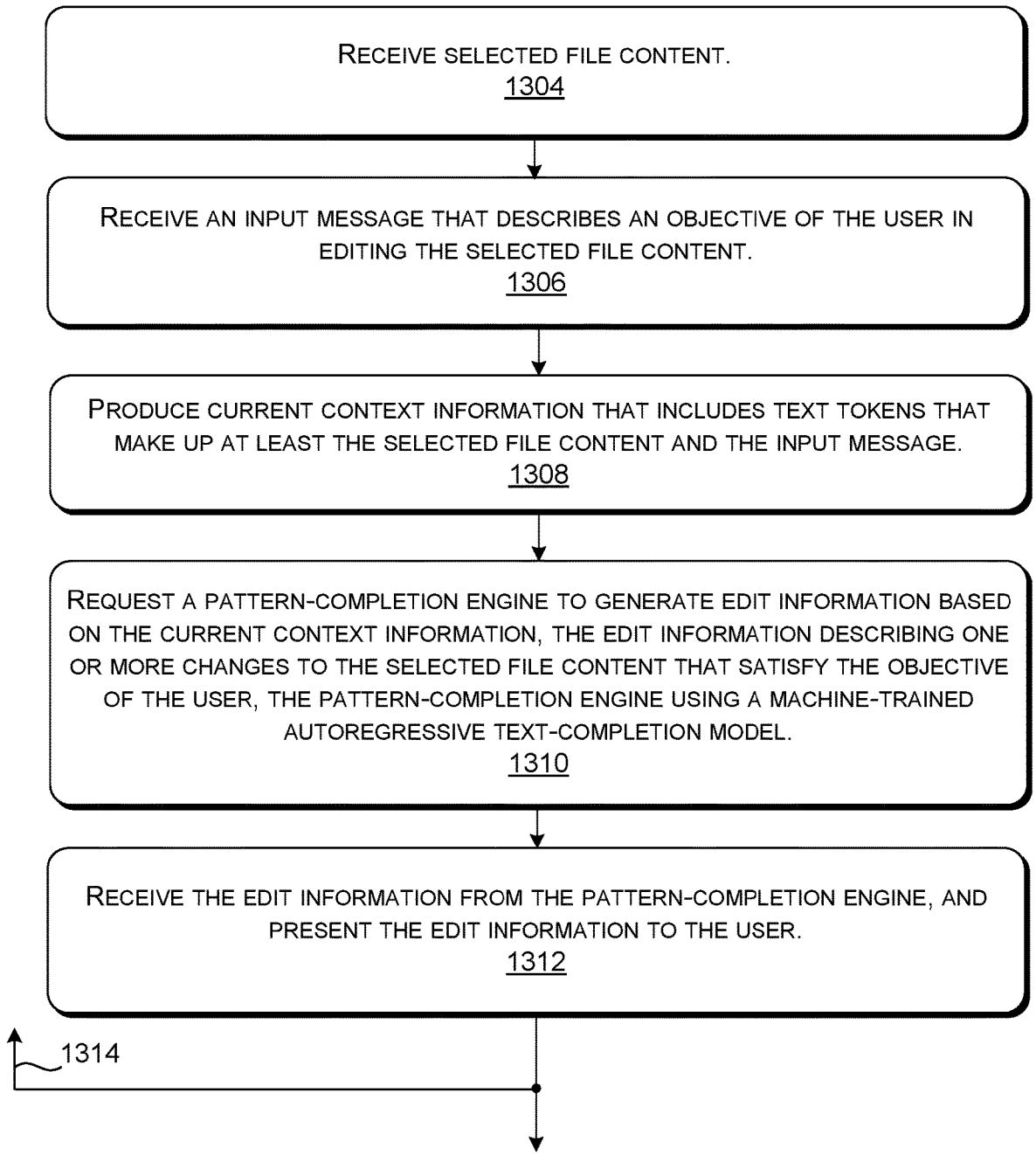
FIG. 13 is a flowchart that summarizes one manner of operation of the agent system of FIG. 1.
Figure 15:
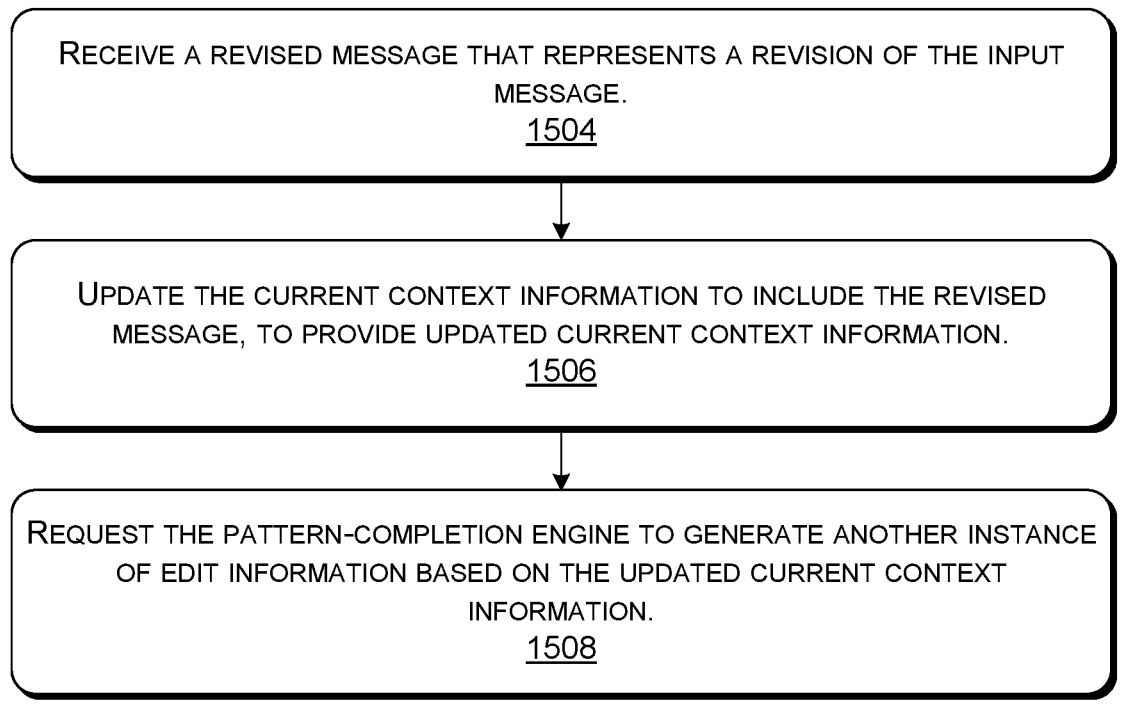
FIG. 15 is a flowchart that summarizes additional operations that can be performed by the agent system of FIG. 1.

FIGS. 13-15 show processes that explain the operation of the agent system 104 and the training framework 118 of Section A in flowchart form, according to some implementations. Since the principles underlying the operation of the agent system 104 and the training framework 118 have already been described in Section A, certain operations will be addressed in summary fashion in this section. Each flowchart is expressed as a series of operations performed in a particular order. But the order of these operations is merely representative, and can be varied in other implementations. Further, any two or more operations described below can be performed in a parallel manner. In some implementations, the blocks shown in the flowcharts that pertain to processing-related functions are implemented by the hardware logic circuitry described in Section C, which, in turn, can be implemented by one or more hardware processors and/or other logic units that include a task-specific collection of logic gates.

FIG. 13 shows a process 1302 that summarizes one manner of operation of the agent system 104 of FIG. 1. In block 1304, the agent system 104 receives selected file content. In block 1306, the agent system 104 receives an input message that describes an objective of the user in editing the selected file content. In block 1308, the agent system 104 produces current context information that includes text tokens that make up at least the selected file content and the input message. In block 1310, the agent system 104 requests a pattern-completion engine 114 to generate edit information based on the current context information, the edit information describing one or more changes to the selected file content that satisfy the objective of the user. The pattern-completion engine 114 uses a machine-trained autoregressive text-completion model (e.g., the edit model 116). In block 1312, the agent system 104 receives the edit information from the pattern-completion engine 114, and presents the edit information to the user, e.g., via a user interface presentation of the user computing device 112. In some implementations, the training process incorporates testing to increase a likelihood that the edit information provided by the pattern-completion engine 114 produces functionally correct results and satisfies one or more computer performance metrics. A loop 1314 indicates that the above-described operations can be repeated, e.g., via paths A or B of FIG. 2.

FIG. 14 shows a process 1402 that summarizes one manner of operation of the training framework 118 of FIG. 9. In block 1404, in one part of a training process, the training framework 118 generates the code-language model 904 based on a repository of natural language training examples and a repository of computer program training examples. In block 1406, in another part of the training process, the training framework 118 fine-tunes the code-language model based on another repository that describes revisions made to plural files, to produce the original edit model 912. Each particular revision in the repository includes a revision message that describes an objective of the particular revision, and file change information that implements the revision. In block 1408, in another part of the training process, the training framework 118 further refines the original edit model 912 based on another repository of selected training examples that are determined to satisfy one or more tests, to produce the refined edit model 916. The tests include one or more correctness tests 1410, one or more performance-related tests 1412, and/or one or more tests 1414 that involve human evaluations. More generally, the test(s) are used to increase a likelihood that the edit information, when executed on the program execution platform 110, satisfies specified performance objectives (such as code-correctness-related objectives, memory utilization objectives, latency objectives, code-conciseness-related objectives and other programing style objectives, and so on).

FIG. 15 shows a process 1502 that summarizes additional operations that can be performed by the agent system 104 of FIG. 1. In block 1504, the agent system 104 receives a revised message that represents a revision of the input message. In block 1506, the agent system 104 updates the current context information 126 to include the revised message, to provide updated current context information. In block 1508, the agent system 104 requests the pattern-completion engine 114 to generate another instance of edit information based on the updated current context information.

C. Representative Computing Functionality

Figure 16:
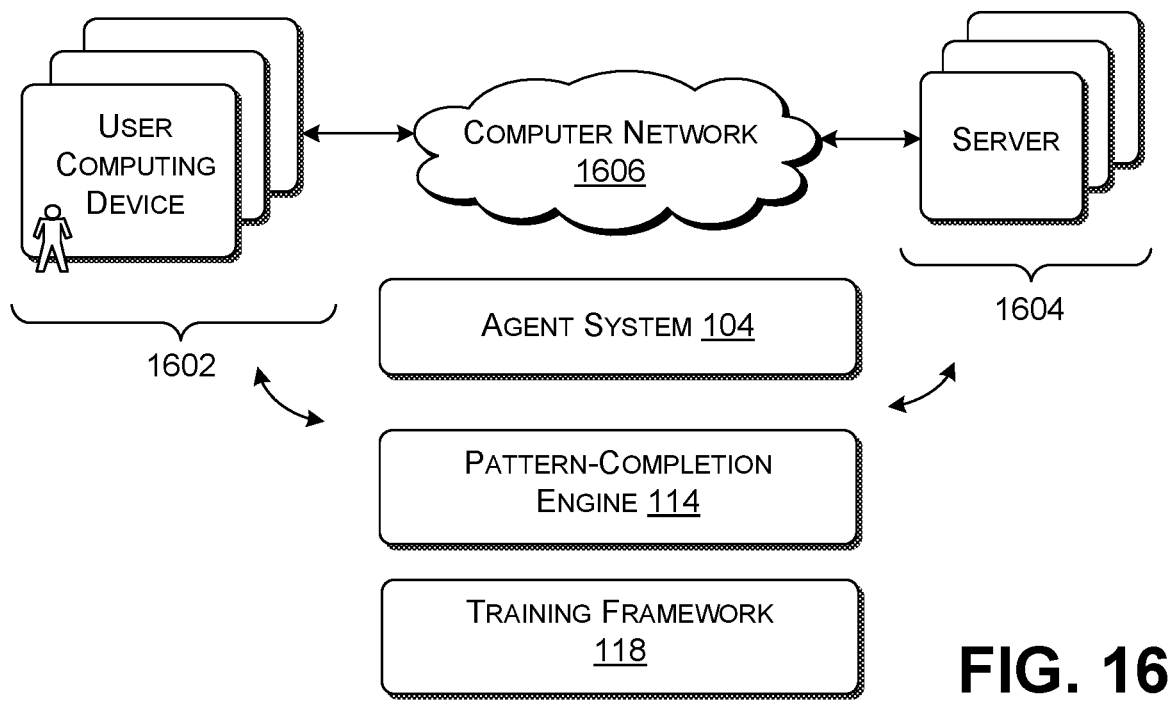
FIG. 16 shows computing equipment that can be used to implement the agent system shown in FIG. 1 and the training framework of FIG. 9.

FIG. 16 shows an example of computing equipment that can be used to implement any of the systems summarized above. The computing equipment includes a set of user computing devices 1602 coupled to a set of servers 1604 via a computer network 1606. Each user computing device can correspond to any device that performs a computing function, including a desktop computing device, a laptop computing device, a handheld computing device of any type (e.g., a smartphone, a tablet-type computing device, etc.), a mixed reality device, a wearable computing device, an Internet-of-Things (IoT) device, a gaming system, and so on. The computer network 1606 can be implemented as a local area network, a wide area network (e.g., the Internet), one or more point-to-point links, or any combination thereof.

FIG. 16 also indicates that agent system 104, the pattern-completion engine 114, and the training framework 118 can be spread across the user computing devices 1602 and/or the servers 1604 in any manner. For instance, in some cases, the agent system 104 is entirely implemented by one or more of the servers 1604. Each user can interact with the servers 1604 via a user computing device. In other cases, the agent system 104 is entirely implemented by a user computing device in local fashion, in which case no interaction with the servers 1604 is necessary. In another case, the functionality associated with the agent system 104 is distributed between the servers 1604 and each user computing device in any manner. Although not shown in FIG. 16, the base editing system 106 and execution platform 110 can also be implemented by any combination of local and/or remote resources.

Figure 17:
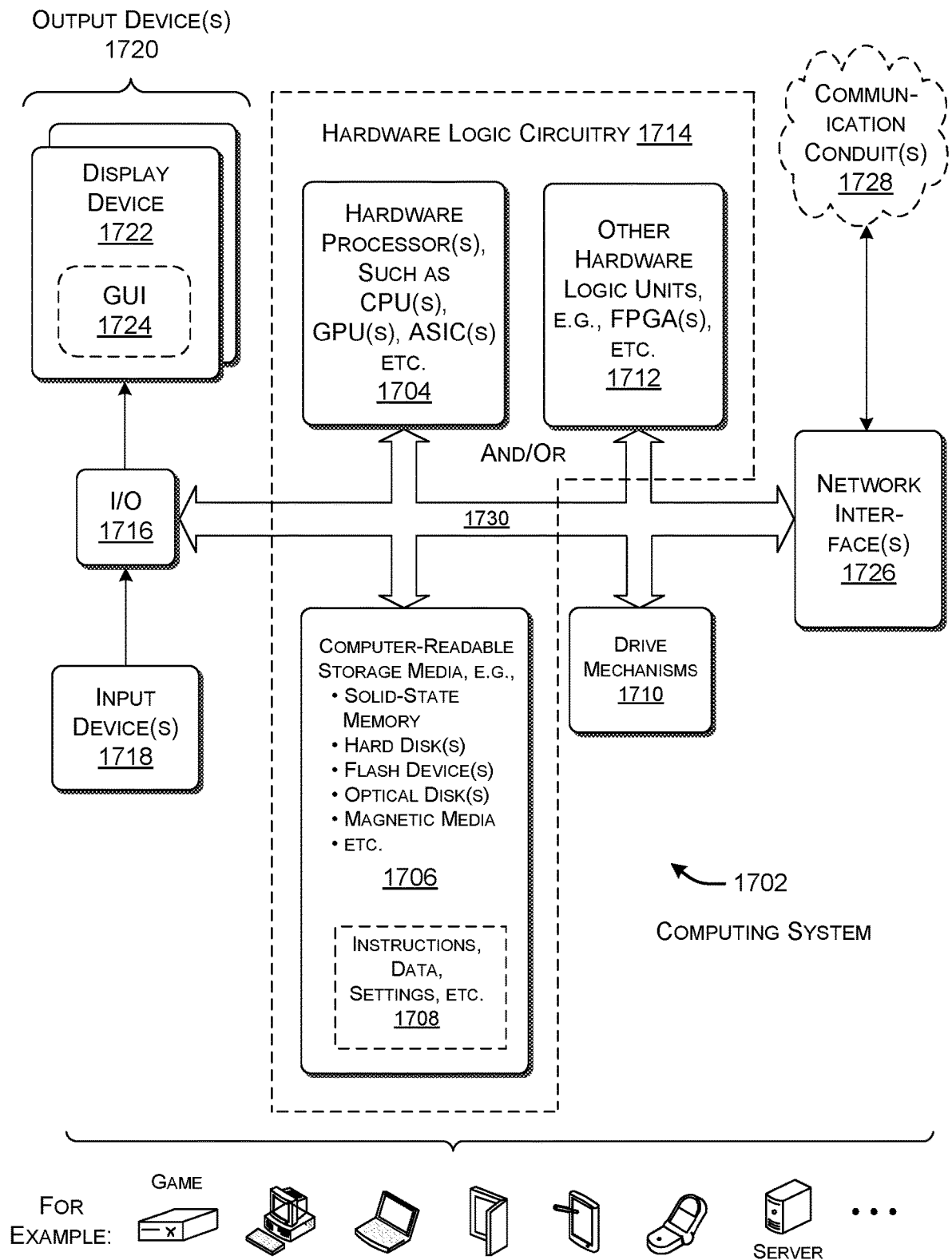
FIG. 17 shows an illustrative type of computing system that can be used to implement any aspect of the features shown in the foregoing drawings.

FIG. 17 shows a computing system 1702 that can be used to implement any aspect of the mechanisms set forth in the above-described figures. For instance, the type of computing system 1702 shown in FIG. 17 can be used to implement any user computing device or any server shown in FIG. 16. In all cases, the computing system 1702 represents a physical and tangible processing mechanism.

The computing system 1702 can include one or more hardware processors 1704. The hardware processor(s) 1704 can include, without limitation, one or more Central Processing Units (CPUs), and/or one or more Graphics Processing Units (GPUs), and/or one or more Application Specific Integrated Circuits (ASICs), and/or one or more Neural Processing Units (NPUs), etc. More generally, any hardware processor can correspond to a general-purpose processing unit or an application-specific processor unit.

The computing system 1702 can also include computer-readable storage media 1706, corresponding to one or more computer-readable media hardware units. The computer-readable storage media 1706 retains any kind of information 1708, such as machine-readable instructions, settings, data, etc. Without limitation, the computer-readable storage media 1706 can include one or more solid-state devices, one or more magnetic hard disks, one or more optical disks, magnetic tape, and so on. Any instance of the computer-readable storage media 1706 can use any technology for storing and retrieving information. Further, any instance of the computer-readable storage media 1706 may represent a fixed or removable unit of the computing system 1702. Further, any instance of the computer-readable storage media 1706 can provide volatile or non-volatile retention of information.

More generally, any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se in transit, while including all other forms of computer-readable media.

The computing system 1702 can utilize any instance of the computer-readable storage media 1706 in different ways. For example, any instance of the computer-readable storage media 1706 may represent a hardware memory unit (such as Random Access Memory (RAM)) for storing information during execution of a program by the computing system 1702, and/or a hardware storage unit (such as a hard disk) for retaining/archiving information on a more permanent basis. In the latter case, the computing system 1702 also includes one or more drive mechanisms 1710 (such as a hard drive mechanism) for storing and retrieving information from an instance of the computer-readable storage media 1706.

The computing system 1702 can perform any of the functions described above when the hardware processor(s) 1704 carry out computer-readable instructions stored in any instance of the computer-readable storage media 1706. For instance, the computing system 1702 can carry out computer-readable instructions to perform each block of the processes described in Section B.

Alternatively, or in addition, the computing system 1702 can rely on one or more other hardware logic units 1712 to perform operations using a task-specific collection of logic gates. For instance, the hardware logic unit(s) 1712 can include a fixed configuration of hardware logic gates, e.g., that are created and set at the time of manufacture, and thereafter unalterable. Alternatively, or in addition, the other hardware logic unit(s) 1712 can include a collection of programmable hardware logic gates that can be set to perform different application-specific tasks. The latter class of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 17 generally indicates that hardware logic circuitry 1714 includes any combination of the hardware processor(s) 1704, the computer-readable storage media 1706, and/or the other hardware logic unit(s) 1712. That is, the computing system 1702 can employ any combination of the hardware processor(s) 1704 that execute machine-readable instructions provided in the computer-readable storage media 1706, and/or one or more other hardware logic unit(s) 1712 that perform operations using a fixed and/or programmable collection of hardware logic gates. More generally stated, the hardware logic circuitry 1714 corresponds to one or more hardware logic units of any type(s) that perform operations based on logic stored by the hardware logic unit(s), e.g., in the form of instructions in the computer-readable storage media and/or or instructions that form an integral part of logic gates. Further, in some contexts, each of the terms "component," "module," "engine," "system," and "tool" refers to a part of the hardware logic circuitry 1714 that performs a particular function or combination of functions.

In some cases (e.g., in the case in which the computing system 1702 represents a user computing device), the computing system 1702 also includes an input/output interface 1716 for receiving various inputs (via input devices 1718), and for providing various outputs (via output devices 1720). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers, gyroscopes, etc.), and so on. One particular output mechanism can include a display device 1722 and an associated graphical user interface presentation (GUI) 1724. The display device 1722 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing system 1702 can also include one or more network interfaces 1726 for exchanging data with other devices via one or more communication conduits 1728. One or more communication buses 1730 communicatively couple the above-described units together.

The communication conduit(s) 1728 can be implemented in any manner, e.g., by a local area computer network, a wide area computer network (e.g., the Internet), point-to-point connections, etc., or any combination thereof. The communication conduit(s) 1728 can include any combination of hardwired links, wireless links, routers, gateway functionality, name servers, etc., governed by any protocol or combination of protocols.

FIG. 17 shows the computing system 1702 as being composed of a discrete collection of separate units. In some cases, the collection of units corresponds to discrete hardware units provided in a computing device chassis having any form factor. FIG. 17 shows illustrative form factors in its bottom portion. In other cases, the computing system 1702 can include a hardware logic unit that integrates the functions of two or more of the units shown in FIG. 1. For instance, the computing system 1702 can include a system on a chip (SoC or SOC), corresponding to an integrated circuit that combines the functions of two or more of the units shown in FIG. 17.

The following summary provides a non-exhaustive set of illustrative examples of the technology set forth herein.

(A1) According to a first aspect, some implementations of the technology described herein include a computer-implemented method (e.g., the process 1302) for editing selected file content. The method includes: receiving (e.g., in block 1304) selected file content; receiving (e.g., in block 1306) an input message that describes an objective of the user in editing the selected file content; producing (e.g., in block 1308) current context information that includes text tokens that make up at least the selected file content and the input message; and requesting (e.g., in block 1310) a pattern-completion engine (e.g., 114) to generate edit information based on the current context information, the edit information describing one or more changes to the selected file content that satisfy the objective of the user. The pattern-completion engine uses a machine-trained autoregressive text-completion model (e.g., the edit model 116). The autoregressive text-completion model is trained by a training process based on information extracted from a repository that describes revisions made to plural files, and based on training examples that are selected to satisfy one or more tests, each particular revision in the repository including a revision message that describes an objective of the particular revision, and file change information that implements the revision. The method further includes receiving (e.g., in block 1312) the edit information from the pattern-completion engine, and presenting the edit information to the user. The one or more tests are used to increase a likelihood that the edit information, when executed on an execution platform (e.g., 110), satisfies specified performance objectives. The method is technically advantageous because it expedites the task of developing file content, and more effectively ensures that the file content possesses desired characteristics (e.g., by possessing desired latency characteristics, memory utilization characteristics, etc.).

(A2) According to some implementations of the method of A1, the selected file content is a portion of a computer program.

(A3) According to some implementations of the method of A2, the method further includes executing the computer program on the program execution platform.

(A4) According to some implementations of any of the methods of A1-A3, the selected file content is a portion of file content that is presented by a user interface presentation of a user computing device.

(A5) According to some implementations of any of the methods of A1-A4, the selected file content includes content provided by two or more files.

(A6) According to some implementations of any of the methods of A1-A5, the pattern-completion engine is implemented as a transformer-based decoder.

(A7) According to some implementations of any of the methods of A1-A6, the method further includes: receiving a revised message that represents a revision of the input message; updating the current context information to include the revised message, to provide updated current context information; and requesting the pattern-completion engine to generate another instance of edit information based on the updated current context information.

(A8) According to some implementations of any of the methods of A1-A7, a part of the training process includes generating a code-language model based on a repository of natural language training examples and a repository of computer program training examples. Another part of the training process includes fine-tuning the code-language model based on the repository that describes the revisions.

(A9) According to some implementations of any of the methods of A1-A8, the training process includes: generating a repository of selected training examples that satisfy one or more computer performance metrics; and performing fine-tuning of the autoregressive text-completion model based on the repository of selected training examples.

(A10) According to some implementations of the method of A9, the method uses a machine-trained model to predict at least one computer performance metric.

(A11) According to some implementations of any of the methods of A1-A3, the training process includes: generating a repository of selected training examples that satisfy one or more correctness tests, the one or more correctness tests ensuring that the selected training examples produce predetermined expected results; and performing fine-tuning of the autoregressive text-completion model based on the repository of selected training examples.

(A12) According to some implementations of the method of A11, the correctness tests are automatically generated by a machine-trained model.

(A13) According to some implementations of any of the methods of A1-A12, the training process includes: generating a repository of selected training examples that are chosen based on judgments of at least one human evaluator, the at least one human evaluator making each judgment by choosing among two instances of edit information; and performing fine-tuning of the autoregressive text-completion model based on the repository of selected training examples.

In yet another aspect, some implementations of the technology described herein include a computing system (e.g., computing system 1702). The computing system includes hardware logic circuitry (e.g., 1714) that is configured to perform any of the methods described herein (e.g., any of the methods of A1-A13).

In yet another aspect, some implementations of the technology described herein include a computer-readable storage medium (e.g., the computer-readable storage media 1706) for storing computer-readable instructions (e.g., information 1708). One or more hardware processors (e.g., 1704) execute the computer-readable instructions to perform any of the methods described herein (e.g., any of the methods of A1-A13).

More generally stated, any of the individual elements and steps described herein can be combined, without limitation, into any logically consistent permutation or subset. Further, any such combination can be manifested, without limitation, as a method, device, system, computer-readable storage medium, data structure, article of manufacture, graphical user interface presentation, etc. The technology can also be expressed as a series of means-plus-format elements in the claims, although this format should not be considered to be invoked unless the phase "means for" is explicitly used in the claims.

As to terminology used in this description, the phrase "configured to" encompasses various physical and tangible mechanisms for performing an identified operation. The mechanisms can be configured to perform an operation using the hardware logic circuitry 1714 of Section C. The term "logic" likewise encompasses various physical and tangible mechanisms for performing a task. For instance, each processing-related operation illustrated in the flowcharts of Section B corresponds to a logic component for performing that operation.

This description may have identified one or more features as "optional," or may have used other conditional language in the description of the feature(s). This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Further, the descriptors "first," "second," "third," etc. are used to distinguish among different items, and do not imply an ordering among items, unless otherwise noted. The phrase "A and/or B" means A, or B, or A and B. Further, the terms "comprising," "including," and "having" are open-ended terms that are used to identify at least one part of a larger whole, but not necessarily all parts of the whole. Finally, the terms "exemplary" or "illustrative" refer to one implementation among potentially many implementations.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for editing selected file content, comprising:
   receiving the selected file content;
   receiving an input message that describes an editing objective in editing the selected file content;
   producing current context information that includes text tokens that make up at least the selected file content and the input message;
   requesting a pattern-completion engine to generate edit information based on the current context information, the edit information describing one or more changes to the selected file content that satisfy the editing objective,
   the pattern-completion engine using a machine-trained autoregressive text-completion model that uses a neural network decoder, the autoregressive text-completion model having been trained by a training process based on information extracted from a repository that describes revisions made to plural files, and
   based on training examples that are selected to satisfy one or more tests, each particular revision in the repository including a revision message that describes an objective of the particular revision, and file change information that implements the particular revision; and
   receiving the edit information from the pattern-completion engine, and presenting the edit information on a user interface presentation,
   said one or more tests being used to increase a likelihood that the edit information, when executed on a program execution platform, satisfies specified performance objectives.

2. The computer-implemented method of claim 1, wherein the selected file content is a portion of a computer program.

3. The computer-implemented method of claim 2, further comprising executing the computer program on the program execution program.

4. The computer-implemented method of claim 1, wherein the selected file content is a portion of file content that is presented by the user interface presentation of a user computing device.

5. The computer-implemented method of claim 1, wherein the selected file content includes content provided by two or more files.

6. The computer-implemented method of claim 1, wherein the pattern-completion engine is implemented as a transformer-based decoder.

7. The computer-implemented method of claim 1, further including:

receiving a revised message that represents a revision of the input message;

updating the current context information to include the revised message, to provide updated current context information; and requesting the pattern-completion engine to generate another instance of edit information based on the updated current context information.

8. The computer-implemented method of claim 1, wherein a part of the training process includes generating a code-language model based on a repository of natural language training examples and a repository of computer program training examples, and wherein another part of the training process includes fine-tuning the code-language model based on the repository that describes the revisions.

9. The computer-implemented method of claim 1, wherein the training process includes:

generating a repository of selected training examples that satisfy one or more computer performance metrics; and performing fine-tuning of the autoregressive text-completion model based on the repository of selected training examples.

10. The computer-implemented method of claim 9, wherein the method uses a machine-trained model to predict at least one computer performance metric.

11. The computer-implemented method of claim 1, wherein the training process includes:

generating a repository of selected training examples that satisfy one or more correctness tests, said one or more correctness tests ensuring that the selected training examples produce predetermined expected results; and performing fine-tuning of the autoregressive text-completion model based on the repository of selected training examples.

12. The computer-implemented method of claim 11, wherein the correctness tests are automatically generated by a machine-trained model.

13. The computer-implemented method of claim 1, wherein the training process includes:

generating a repository of selected training examples that are chosen based on judgments of at least one human evaluator, said at least one human evaluator making each judgment by choosing among two instances of edit information; and performing fine-tuning of the autoregressive text-completion model based on the repository of selected training examples.

14. A computing system for editing selected file content, comprising:

hardware logic circuitry configured to execute instructions provided in memory to perform operations including:

receiving the selected file content;

receiving an input message that describes an editing objective in editing the selected file content;

producing current context information that includes text tokens that make up at least the selected file content and the input message;

requesting a pattern-completion engine to generate edit information based on the current context information, the edit information describing one or more changes to the selected file content that satisfy the editing objective, the pattern-completion engine using a machine-trained autoregressive text-completion model; and receiving the edit information from the pattern-completion engine, and presenting the edit information on a user interface presentation, the edit information specifying changes to a computer program, the computer program being executable on a program execution platform.

15. The computing system of claim 14, wherein the operations further include:

receiving a revised message that represents a revision of the input message;

updating the current context information to include the revised message, to provide updated current context information; and requesting the pattern-completion engine to generate another instance of edit information based on the updated current context information.

16. The computing system of claim 14, wherein the autoregressive text-completion model is trained by a training process, wherein part of the training process includes generating a code-language model based on a repository of natural language training examples and a repository of computer program training examples, wherein another part of the training process involves fine-tuning the code-language model based on a repository that describes revisions made to plural files, to produce an original edit model, each particular revision in the repository including a revision message that describes an objective of the particular revision, and file change information that implements the particular revision, and wherein another part of the training process involves refining the original edit model based on at least one repository of selected training examples that are determined to satisfy one or more tests.

17. A computer-readable storage medium for storing computer-readable instructions, one or more hardware processors performing a method when executing the computer-readable instructions that comprises:

receiving selected file content;

receiving an input message that describes an editing objective in editing the selected file content;

producing current context information that includes text tokens that make up at least the selected file content and the input message;

requesting a pattern-completion engine to generate edit information based on the current context information, the edit information describing one or more changes to the selected file content that satisfy the editing objective; and receiving the edit information from the pattern-completion engine, the pattern-completion engine using a machine-trained autoregressive text-completion model that uses a neural network decoder, the autoregressive text-completion model having been trained by a training process, one part of the training process including generating a code-language model based on a repository of natural language training examples and a repository of computer program training examples, another part of the training process including fine-tuning the code-language model based on another repository that describes revisions made to plural files, to produce an original edit model, each particular revision in the repository of revisions including a revision message that describes an objective of the particular revision, and file change information that implements the particular revision, and another part of the training process including further refining the original edit model based on another repository of selected training examples that are determined to satisfy one or more tests.

18. The computer-readable storage medium of claim 17, wherein the selected training examples are determined to satisfy one or more computer performance metrics.

19. The computer-readable storage medium of claim 17, wherein the selected training examples are determined to satisfy one or more correctness tests, said one or more correctness tests ensuring that the selected training examples produce predetermined expected results.

20. The computer-readable storage medium of claim 17, wherein the selected training examples are chosen based on judgments of at least one human evaluator.

* * * * *